US007136595B2

(12) United States Patent
Aoki et al.

(10) Patent No.: US 7,136,595 B2
(45) Date of Patent: Nov. 14, 2006

(54) OPTICAL TRANSMITTER, OPTICAL RECEIVER, AND MANUFACTURING METHOD OF OPTICAL DEVICE

(75) Inventors: Masahiro Aoki, Kokubunji (JP); Junji Shigeta, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 723 days.

(21) Appl. No.: 10/083,617

(22) Filed: Feb. 27, 2002

(65) Prior Publication Data
US 2004/0207896 A1 Oct. 21, 2004

(30) Foreign Application Priority Data
Dec. 10, 2001 (JP) .............................. 2001-375318

(51) Int. Cl.
*H04B 10/04* (2006.01)
(52) U.S. Cl. ...................... 398/183; 398/182; 398/185; 398/186; 398/187; 398/202; 398/214; 398/130; 398/135; 359/245; 359/248; 359/237; 359/254; 385/2; 385/3; 385/4; 385/8; 385/14
(58) Field of Classification Search ................ 398/182, 398/183, 202, 135, 130, 185, 186, 187, 214; 359/245, 248, 237, 254; 385/2, 3, 4, 8, 14
See application file for complete search history.

(56) References Cited

U.S. PATENT DOCUMENTS 5,835,646 A * 11/1998 Yoshimura et al. ........... 385/14
6,057,954 A * 5/2000 Parayanthal et al. ........ 359/248
2002/0109897 A1* 8/2002 Mirshekar-Syahkal et al. .. 359/245

FOREIGN PATENT DOCUMENTS

JP 06-160788 11/1992

OTHER PUBLICATIONS

K. Kawano, M. Kohtoku, M. Ueki, T. Ito, S. Kondoh, Y. Noguchi and Y. Hasumi, "Polarisation-insensitive Travelling-wave Electrode Electroabsorption (TW-EA) Modulator with Bandwidth Over 50 GHz and Driving Voltage Less than 2V", Electronic Letters, Aug. 28, 1997, vol. 33, No. 18, pp. 1580-1581.

L. Morl, D. Hoffmann, K. Matzen, C. Bornholdt, G.G. Mekonnen, F. Reier, "Traveling Wave Electrodes for 50 GHz Operation of Opto-Electronic Devices Based on InP", IEEE, 11th International Conference on Indium Phosphide and Related Materials, May 16-20, 1999, pp. 385-388.

* cited by examiner

*Primary Examiner*—Hanh Phan
(74) *Attorney, Agent, or Firm*—Reed Smith LLP; Stanley P. Fisher, Esq.; Juan Carlos A. Marquez, Esq.

(57) ABSTRACT

An optical transmitter-receiver is provided which is suitable for a high-speed optical communication system. A high-frequency electric line on a mounting substrate becomes a traveling-wave electrode of a semiconductor optical element equivalently by the following steps: separately manufacturing the mounting substrate having the high-frequency electric line, and the semiconductor optical element for which high-frequency design has been applied beforehand; and then bonding and mounting of drive electrodes of the mounting substrate and the semiconductor optical element through a soldering material. In addition, it is also possible to have a configuration in which not only junction down mounting of high-frequency semiconductor optical elements, but also that of an electronic element for electrically driving and controlling a light source such as a semiconductor laser and for electrically driving and controlling a high-frequency semiconductor optical element, is performed on the mounting substrate.

11 Claims, 11 Drawing Sheets

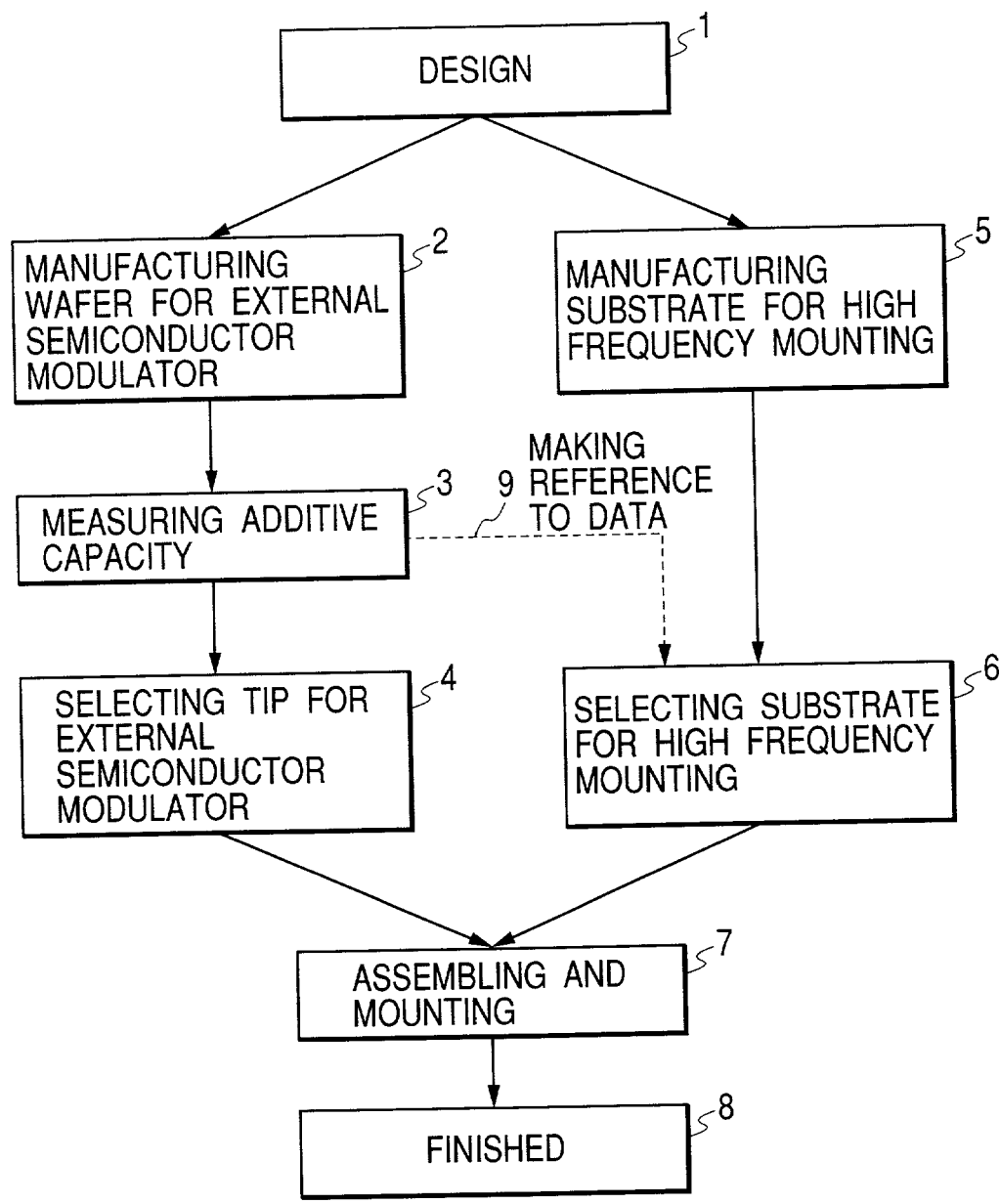

OPTICAL TRANSMITTER, OPTICAL RECEIVER, AND MANUFACTURING METHOD OF OPTICAL DEVICE

BACKGROUND OF THE INVENTION

1. Field of the Invention

The present invention relates to an optical transmission device. In particular, the present invention relates to the following: an optical element that modulates output light of a semiconductor laser from outside; or an optical transmission device that has an output portion for coupling an output of this optical element to a transmission optical fiber; or a novel structure of a semiconductor optical detection device. The present invention is particularly useful as an optical transmitter-receiver that is suitable for a high-speed optical communication system capable of handling 10 gigabit per second or more.

2. Related Art

Optical modulators and photodetectors, which are used for optical communication, are broadly classified into a surface incidence type, a waveguide type, a traveling wave type based on element structure. Among them, elements of the surface incidence type and the waveguide type have a limit of operation speed resulting from the so-called CR time constant (element capacity C, element resistance R). Therefore, in order to realize speedup, it is necessary to reduce C by reducing an area of the element, or by other means.

On the other hand, the traveling-wave type element is devised as an improved version of the waveguide-type element. An electrode, which is formed in proximity to an optical waveguide, is treated as a transmission line. A high-frequency electric signal propagates through the electrode in the form of a traveling wave. In this case, it is possible to realize high-speed operation, which does not depend on the CR time constant, by controlling traveling speed $V_{opt}$ of a light wave and propagation velocity $V_{ele}$ of a high-frequency electric signal so that they become equal as close as possible. In general, as main waveguide materials for a traveling-wave type element, the following are under examination: niobic acid lithium for optical modulator use, and an optical modulator; and compound semiconductors for photodetector use such as an InP group and a GaAs group. Among them, as regards the traveling-wave element in which a compound semiconductor is used, mainly because difference in refractive indexes (relative dielectric constant) between an electric signal and a light signal is large, it is generally difficult to make the relation between $V_{opt}$ and $V_{ele}$ equal. If a compound semiconductor is used, there is a high possibility that monolithic integration with other optical parts such as a light source, and miniaturization of an element resulting from this, can be realized. For the purpose of solving the above-mentioned mismatch of speed between an optical signal and an electric signal, which relates to the traveling-wave element that uses a compound semiconductor, some techniques has been devised.

As one of the conventional improvement techniques, the following example is reported: at the top of an optical waveguide made on a semiconductor substrate, or in close proximity to the top of the optical waveguide, a traveling-wave electrode is integrally formed; and high-frequency characteristics have been improved particularly by making a shape of a traveling-wave type electrode appropriate. In this configuration, optimum design of a semiconductor structure and optimum design of a traveling-wave electrode should be performed in the same element. In addition, if in particular a length of a waveguide in a light-wave travelling direction becomes about 1000 μm or more, it is necessary to make a very thick metal electrode having a thickness of 4 through 10 μm, for example, on a semiconductor element in order to improve attenuation of intensity resulting from traveling of a high-frequency electric signal. This electrode is thicker than an electrode of a general semiconductor optical element by a factor of about ten. Therefore, there is a large mismatch of structure between a general optical semiconductor element and a traveling wave electrode.

In addition, as another improvement technique, a technique by which phase matching of an electromagnetic wave and a light wave is improved by separating an electrode on the upper part of a waveguide cyclically has been proposed. Although pseudo phase matching is achieved by means of this technique, an element size is large, and an element manufacturing process is also very complicated.

Because of the background as described above, the traveling-wave optical elements, which use a semiconductor, have not been broadly put to practical use under the existing circumstances.

In this connection, as documents that describe these conventional semiconductor traveling-wave electrode optical element, the following can be named: IEE Electronics Letters, the 18th issue, vol. 33, page 1580, Aug. 28, 1997; and International Conference on Indium Phosphorus, paper number WeA1-3, preprint page 385, 1998.

On the other hand, as a new document relating to the present invention, Japanese Patent Application Laid-Open No. Hei 6-160788 can be named. In this document, for the purpose of realizing a niobic acid lithium optical modulator, a driving voltage of which is low, and an optical insertion loss of which is also low, and for the purpose of reducing a propagation loss of a high-frequency electric signal, an introduction of an oxide superconduction electrode is proposed. However, under the existing circumstances, stable operation of oxide superconduction electrode materials at room temperature is not realized. Therefore, this method has not been put to practical use.

A main object of the present invention is to realize an economical optical transmitter-receiver having a simple structure, which is suitable for a high-speed optical communication system. Another object of the present invention is to improve operation speed of a traveling-wave element having a compound semiconductor, which is particularly suitable for monolithic accumulation with other optical parts such as a semiconductor laser, by means of an easy technique.

SUMMARY OF THE INVENTION

Main points of the present invention will be described as below. To be more specific, a transmitter and an optical receiver, or an optical transmitter-receiver, according to the present invention, are characterized by the following: a high-frequency element mounting substrate having a high-frequency electric line, and a semiconductor optical element for which high-frequency design has been applied beforehand, are separately manufactured; and the mounting substrate and driving electrodes of the semiconductor optical element are bonded and mounted by a bonding means such as a soldering material. In this case, for the connection of both, it is generally preferable to use a method in which an active layer side is used for mounting as a mounting substrate side with respect to a crystal-growth substrate having active elements. This method is designated as so-called junction down mounting. Thus, the present invention has a configuration in which the high-frequency electric line on the mounting substrate becomes a traveling-wave electrode of the semiconductor optical element equivalently.

In addition, it is also possible to have a configuration in which not only junction down mounting of high-frequency semiconductor optical elements, but also that of an electronic element for electrically driving and controlling a light source such as a semiconductor laser and for electrically driving and controlling a high-frequency semiconductor optical element, is performed on the mounting substrate described above.

As the mounting substrate described above, a dielectric material such as aluminum nitride, boron nitride, silicon oxide, aluminum oxide, beryllium oxide, silicon carbide, and diamond, or silicon can be used. A waveguide type is desirable for the semiconductor optical element described above.

According to the present invention, a high-frequency element mounting substrate having a high-frequency electric line, and a semiconductor optical element for which high-frequency design has been applied beforehand, can be optimally individually designed and manufactured. Moreover, it is possible to perform hybrid integration of an optical element and an electronic element, each of which is made from a different substrate material, without deteriorating their properties.

The present invention provides a structure and a manufacturing technique that are particularly suitable for a high-speed external optical modulator, an optical transmitter using this, a high-speed light receiving element, and an optical receiver.

BRIEF DESCRIPTION OF THE DRAWINGS

FIG. 10 is a flowchart illustrating a part of a manufacturing process flow of an optical transmitter in the first embodiment.

DETAILED DESCRIPTION OF THE PREFERRED EMBODIMENTS

First Embodiment

Figure 1A:
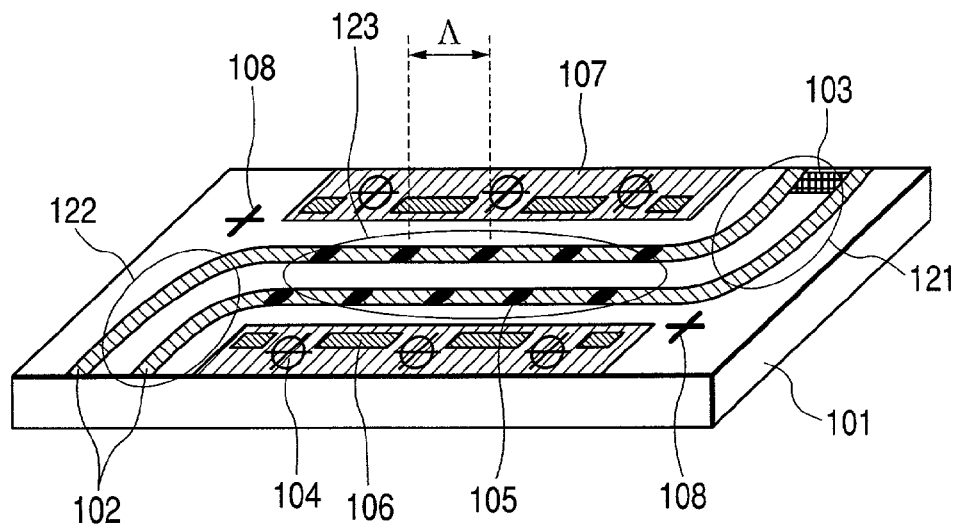
FIGS. 1A through 1C are perspective views illustrating a configuration of one embodiment of an optical transmitter according to the present invention.
Figure 1B:
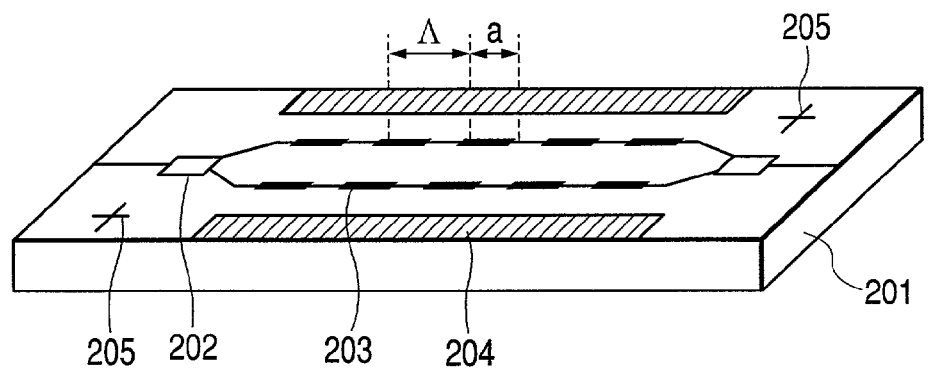
Figure 1C:
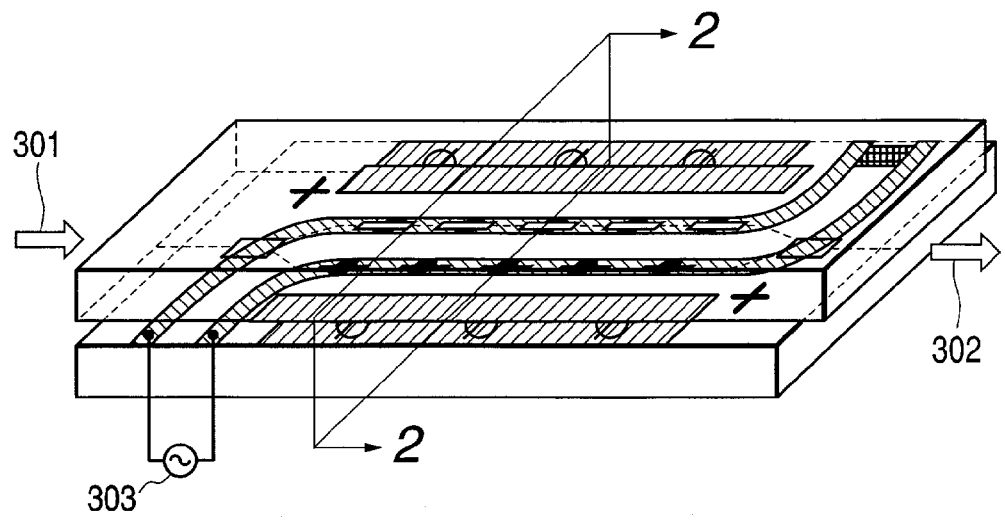

FIGS. 1A through 1C are perspective views illustrating configurations of main portions of an optical transmitter according to the present invention. More specifically, the figures illustrates a structure of a semiconductor optical modulator, which operates in a wavelength band of 1.55 µm, and an outline of a manufacturing technique. As shown in the figures, the main portions of the optical transmitter are formed [FIG. 1C] by performing junction down mounting of a semiconductor optical element [FIG. 1B] on a high-frequency element mounting substrate [FIG. 1A], on which high-frequency lines are formed.

The high-frequency substrate shown in FIG. 1A has a structure in which a high-frequency line 102, a terminal thin film resistance 103 having a resistance value of 50Ω, a ground via hole 104, a pair of ground lines 107 are formed on a dielectric substrate 101 made from an aluminum nitride material. The high-frequency line 102 is formed by a multilayer thin film of Ti, Mo, Ni, Au. Its total thickness is 5 µm. Gold tin solder 106, which is used when mounting and firmly securing optical elements in FIG. 1B later, is formed on the ground line 107. In addition, gold tin solder 105, which supplies power to a separated electrode of an optical element described later, is formed in a central part of the high-frequency line 102 at intervals of Λ=500 µm cyclically. The number of electrode separation is five on one side. By the way, reference numeral 108 is an index marker for positioning that is used at the time of mounting of the optical element. The high-frequency line 102 comprises an electric input portion 122, an optical element mounted portion 123, and a terminal portion 121, if they are roughly classified. Characteristic impedance of the portions has been designed and manufactured so that the characteristic impedance becomes 50Ω, 76Ω, 50Ω respectively. The characteristic impedance values are substantially determined by a shape and a size of a line pattern. They can be designed and manufactured almost accurately on a flat aluminum nitride board by a process using general photolithography. The reason why the characteristic impedance of the optical element mounted portion 123 is set at a high value is that impedance matching when the optical element is mounted later is taken into consideration. This will be described in detail later.

Figure 2:
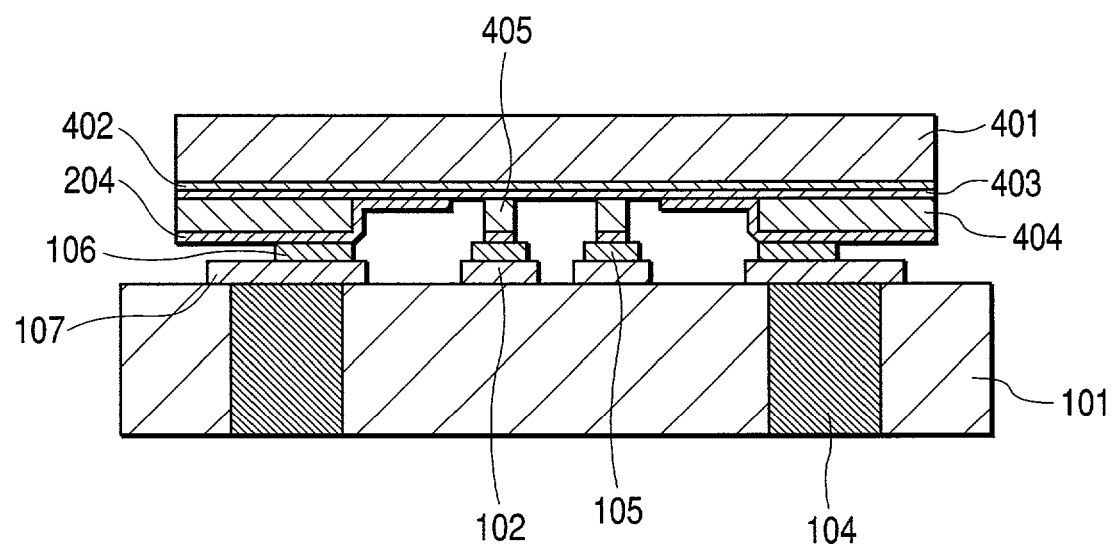
FIG. 2 is a cross section illustrating a configuration of a junction between an optical element mounting substrate and an optical element in FIG. 1.

An optical element shown in FIG. 1B is an interference optical modulator that is formed on a semi-insulating GaAs substrate 201. In this case, an optical modulator on the semi-insulating GaAs substrate will be described as an example. However, for example, a semi-insulating InP substrate may also be used as a substrate. In this embodiment, a cross section of an optical waveguide (a sliced portion in FIG. 1C) is the so-called rib loading type as shown in the upper part of FIG. 2. In this connection, FIG. 2 is an explanatory diagram after junction down mounting that will be described below. Therefore, an optical element is drawn upside down as compared with the order of crystal growth of layers that constitute the optical element. In FIG. 2, reference numeral 401 is a semi-insulating GaAs substrate; reference numerals 402, 404 are Al 0.3 Ga 0.7 As clad layer; reference numeral 403 is a GaAs core layer; and reference numeral 405 is a rib waveguide portion. In FIG. 1B, reference numeral 202 is an optical branching filter; reference numeral 204 is a pair of ground lines on the optical element side; and reference numeral 205 is an index marker for positioning. On the upper part of an optical interference waveguide, separated electrodes for modulator 203 having a length of a=300 µm are formed at intervals of Λ=500 µm cyclically. Corresponding to the mounting substrate, the number of electrode separation is 5. It is to be noted that concerning an optical modulator, etc. as individual elements themselves, a general configuration suffices. Therefore, its detailed description will be omitted.

FIG. 1C illustrates a structure in which a main part of an optical transmitter having a traveling-wave electrode is formed by performing junction down mounting of the optical modulation element on the high frequency element mounting substrate. Both of the high-frequency element mounting substrate and the optical element are disposed so that their surfaces having an electrode are jointed together. Then, using an image recognition technology that uses infrared transmission, they are mounted so that index markers of both are aligned with each other. Thus, the separated electrodes 203 of the optical modulation element are fixedly secured on the high-frequency line 102 on the high-frequency element mounting substrate through the gold tin solder 105. In this case, for the purpose of increasing bond strength of the optical modulation element and strengthening its ground, the gold tin solder 106 on the ground line 107 is used at the same time. As a result, it is possible to form the so-called capacitive load structure in which modulator structures having a capacitive component are disposed at regular intervals on the high-frequency line 102. Reference numeral 301 is incident light to the optical transmitter; reference numeral 302 is modulated light emitted from the optical transmitter; and reference numeral 303 is a high-frequency signal source.

Next, impedance matching of the capacitive loaded structure will be described in detail as below.

In general, high-frequency phase velocity $V_{ele}$ and characteristic impedance Z, which are measured when capacity is added to coplanar electrodes such as high-frequency lines at regular intervals on this high-frequency element mounting substrate, are given by the following expression:

$$v_{ele} = \frac{1}{\sqrt{(C_{cp} + C_{ad}/\Lambda)L_{cp}}}, Z = \sqrt{\frac{L_{cp}}{C_{cp} + C_{ad}/\Lambda}}$$

where Ccp and Lcp are capacity and inductance per unit length of the coplanar electrode respectively. The coplanar electrode is designed and manufactured so that capacity and inductance become 90.9 pF/m and 538 nH/m respectively. Cad is an added capacity value of a semiconductor external modulator. Although accurate manufacturing is difficult because of a manufacturing error of a semiconductor wafer, its measured value is 61.8 fF±5 fF if the wafer, which has been produced experimentally in this example, is measured by a capacity meter. Λ is a placement interval, which is 500 µm. According to the expression described above, $V_{ele}$=9.31×10$^7$ m/s is obtained. This value is almost equivalent to $V_{opt}$=Co/neff=9.20×10$^7$ m/s that is calculated using neff=3.3; where neff is effective refractive index of a semiconductor waveguide, and Co is light velocity. A theoretical modulation band of this element calculated by this value is 716 GHz. In addition, Z=49.5Ω, which is a value suitable for 50Ω matching system. The added capacity Cad of the semiconductor external modulator has a manufacturing error. A margin of the manufacturing error is about ±15 fF depending on a production lot. If the added capacity Cad of the manufactured semiconductor external modulator is 62 fF, which is remarkably different from the margin of the manufacturing error, a high-frequency element mounting substrate, which has been designed and manufactured to have a different value of 76Ω as characteristic impedance of an element mounted portion, may be selected for use.

An optical transmitter, which can operate at modulation speed of 40 gigabit per second and at driving voltage of 4 Vpp, could be realized by applying the high-frequency signal 303 to the high-frequency line 202 while inputting the incident light 301 having a wavelength of 1.55 µm into the optical modulator completed by a combination of the high-frequency substrate and the semiconductor external modulator, both of which have the properties described above. In this embodiment, GaAs corresponding to an operation light wavelength is used; in this case, a band gap, which is difference in energy, is large. Therefore, a driving voltage is 4 Vpp, which is a high value. However, it is to be noted that the driving voltage can be reduced to about 2 Vpp by applying a multi-quantum well structure, which is formed on an InP substrate, to a modulator active layer in order to use a quantum containment Stark effect. The above described the example that designing and manufacturing an optical element and a high-frequency substrate independently before performing junction down mounting of both enables us to realize a high-performance traveling-wave optical element using an easy technique.

Advantages of this technique will be listed as follows:

(1) The most preferable design of an optical element and a high-frequency line is individually possible.

(2) As a result of individual manufacturing, production yield is improved.

(3) A film of an electrode of a high-frequency line can be made thicker, which was difficult for the conventional integral structure from the viewpoint of electrode stress. This is advantageous to realization of a low-loss line.

(4) Because the element manufacturing process is grouped into manufacturing of individual parts, and collection and mounting of the individual parts, a new manufacturing industry, which could not be realized in the past, becomes possible.

Another embodiment, which makes full use of the advantages, will be described as below.

Second Embodiment

Figure 3A:
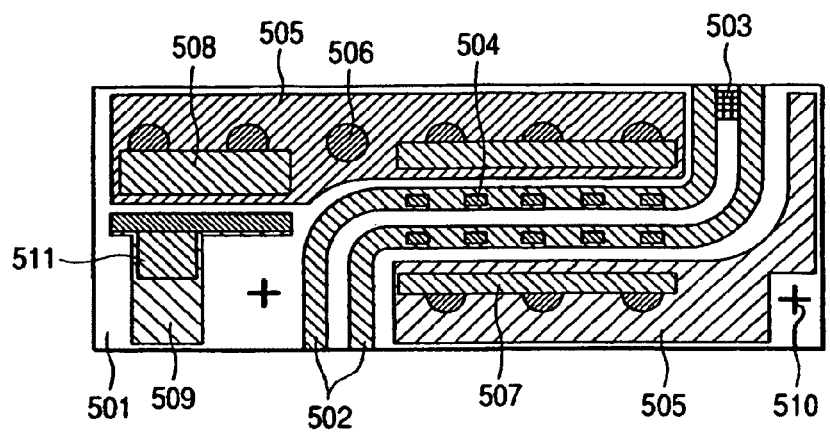
FIGS. 3A through 3C are top views illustrating a configuration of one embodiment of an optical transmitter according to the present invention.
Figure 3B:
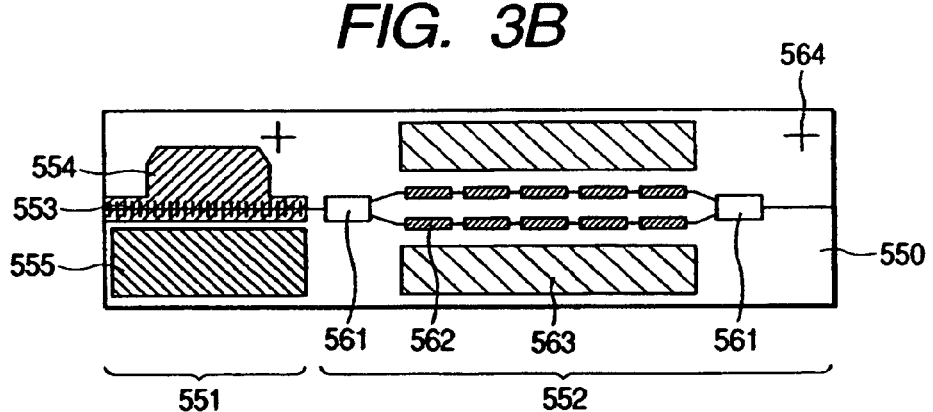
Figure 3C:
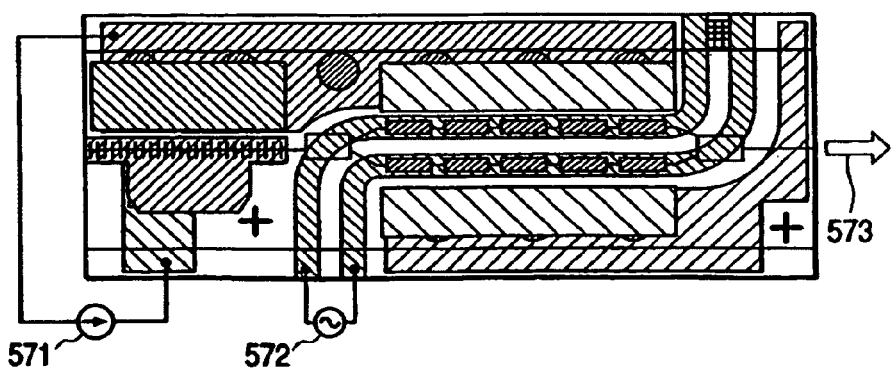

FIGS. 3A through 3C are top views illustrating a configuration of a new optical transmitter according to the present invention. More specifically, the figures illustrate a structure of a transmitter and a manufacturing technique of the transmitter, both of which are used when a semiconductor laser as a light source is monolithically integrated on a waveguide optical modulator operating in a wavelength band of 1.55 µm as described in the first embodiment. As is the case with the first embodiment, the optical transmitter is formed [FIG. 3C] by performing junction down mounting of an optical element [FIG. 3B] on a high-frequency element mounting substrate [FIG. 3A].

The structure of the high frequency element mounting substrate, which is shown in FIG. 3A, is the same as the first embodiment except that a point at which a semiconductor laser portion is disposed is newly added. Moreover, in this example, as compared with the first embodiment, a laser driving electrode terminal 509 is added. In this connection, in FIG. 3A, reference numeral 501 is a dielectric substrate; reference numeral 502 is a high-frequency line; reference numeral 503 is a terminal thin film resistance; reference numeral 504 is gold tin solder; reference numeral 505 is a ground line; reference numeral 506 is a ground via hole; reference numeral 507 is gold tin solder; reference numeral 510 is an index marker for positioning; and reference numeral 511 is gold tin solder.

An integrated light source shown in FIG. 3B is formed on a semi-insulating InP substrate 550. The semiconductor laser portion 551 is a multi-quantum well distributed feedback laser portion made from an InGaAsP material; this multi-quantum well distributed feedback laser portion has a built-in diffraction grating 553, and has an operation wavelength band of 1.55 µm. On the other hand, the waveguide optical modulator 552 is an optical-interference optical modulator portion that has a multi-quantum well structure made from an InGaAlAs material. The semiconductor laser portion 551 described above comprises a p-type electrode 554 and n-type electrode 555. As is the case with the first embodiment, concerning the optical modulator portion 552 shown in FIG. 3B, reference numeral 561 is an optical branching filter; reference numeral 563 is a ground line on optical element side; and reference numeral 564 is an index marker for positioning. On the upper part of an optical interference waveguide, separated electrodes for modulator 562 having a length of 300 µm are formed at intervals of 500 µm cyclically. Corresponding to the mounting substrate 501, the number of electrode separation is 5. It is to be noted that concerning a semiconductor laser portion, an optical modulator, an optical branching filter, etc. as individual elements themselves, a general configuration suffices. Therefore, its detailed description will be omitted.

FIG. 3C illustrates a structure in which an optical transmitter having a traveling-wave electrode is formed by performing junction down mounting of the optical integrated element on the high-frequency element mounting substrate. Both of the high-frequency substrate and the optical integrated elements are disposed so that their surfaces having an electrode are jointed together. Then, using an image recognition technology that uses infrared transmission, both of them are mounted so that index markers of both are aligned with each other. Thus, the electrodes 562 of the optical modulation element are firmly fixed on the corresponding electrode 504 and the corresponding high-frequency line 504 on the high-frequency substrate through gold tin solder. As a result of it, an integrated structure of an interference modulator, which has the so-called capacitive loaded structure, has been formed automatically; more specifically, in the integrated structure of the interference modulator, modulator structures having a capacitive component are disposed at regular intervals on the distributed feedback semiconductor laser 551 and the high-frequency line 502. By the way, in FIG. 3C, reference numeral 573 is emitted modulated light; reference numeral 571 is an electric current source; and reference numeral 572 is a drive signal for the modulators.

A designing method relating to impedance matching of a capacitive loaded structure, and selection and assembling of a high-frequency substrate that matches properties of a semiconductor chip, are basically the same as the first embodiment. Therefore, their detailed description will be omitted.

In this embodiment, in addition to the characteristics described in the first embodiment, the following advantages are added at the same time: an output level of a semiconductor laser is increased; and junction down mounting, which is advantageous to high reliability, can be realized. As a result, an unmodulated output of 5 mW are measured at a wavelength of 1552 µm by connecting the electric current source 571 to the completed optical transmitter to energize the optical transmitter with 100 mA in a forward direction. In this state, an excellent optical modulation waveform, which has rise and fall time of 12 ps or less and an extinction ratio of 12 dB or more, could be obtained by applying the modulator driving signal 572 having modulation speed of 40 gigabit per second and amplitude voltage of 2 Vpp to the high-frequency line 502.

As described above, in this embodiment, a modulator integrated laser of 1.55 µm band formed on the semi-insulating InP substrate was described. However, the present invention can be applied to wavelength bands of 1.3 µm and 1.6 µm by extension, and can also be applied to a modulator integrated laser of 1.3 µm band formed on the semi-insulating GaAs substrate by extension. In this case, combined use of an optical modulator using GaAs materials shown in the first embodiment, and a distributed feedback laser of 1.3 µm band using GaInNAs materials that can be integrated monolithically on a GaAs substrate, enables realization of the present invention.

Third Embodiment

Figure 4A:
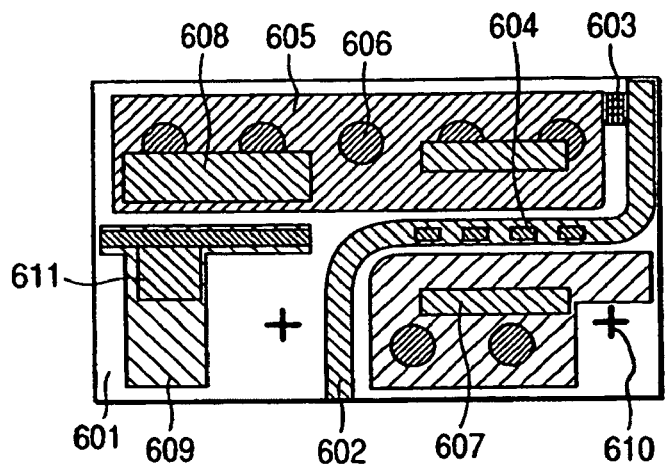
FIGS. 4A through 4C are top views illustrating a configuration of one embodiment of an optical transmitter according to the present invention.
Figure 4B:
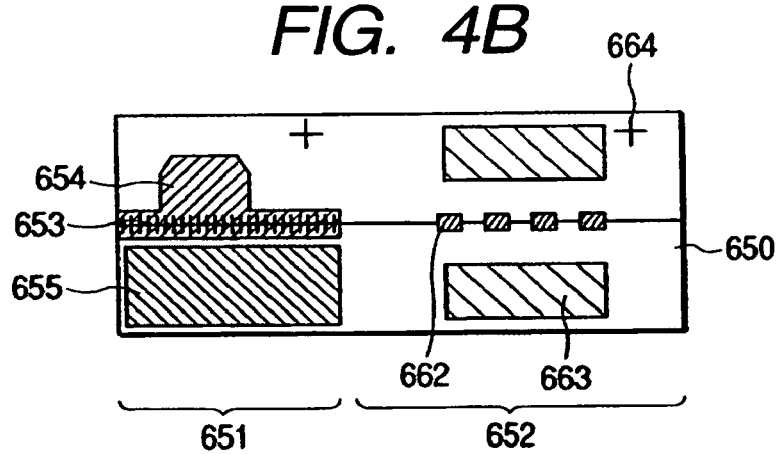
Figure 4C:
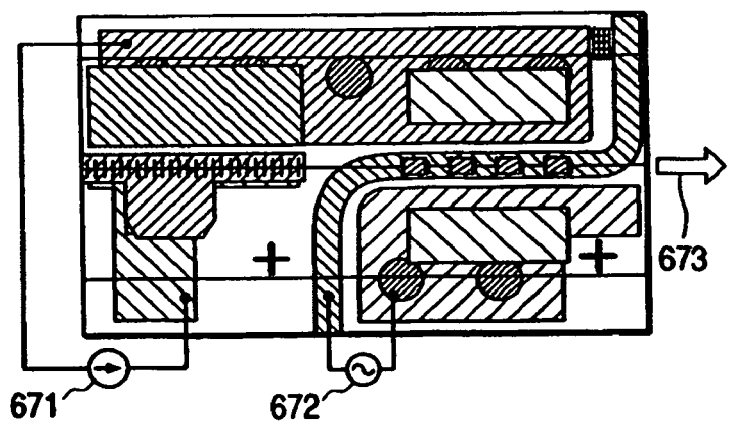

FIGS. 4A through 4C are top views illustrating a configuration of a new optical transmitter according to the present invention. More specifically, in the monolithically integrated light source made of the optical-interference optical modulator and the semiconductor laser, which was described in the second embodiment, this example has a configuration in which the optical modulator is replaced with an electric field absorption optical modulator. As is the case with the second embodiment, the optical transmitter is formed [FIG. 4C] by performing junction down mounting of an optical element [FIG. 4B] on a high-frequency element mounting substrate [FIG. 4A].

A structure of the high-frequency element mounting substrate shown in FIG. 4A corresponds to an electric field absorption modulator having only one waveguide. Therefore, the structure is the same as that in the second embodiment except that the high-frequency line 602 has become a single strip line. In FIG. 4A, reference numeral 601 is a dielectric substrate; reference numeral 602 is a high-frequency line; reference numeral 603 is a terminal thin film resistance; reference numeral 604 is tin solder; reference numeral 605 is a ground line; reference numeral 606 is a ground via hole; reference numeral 607 is tin solder; reference numeral 608 is tin solder; reference numeral 609 is a laser driving electrode terminal; reference numeral 610 is an index marker for positioning; and reference numeral 611 is tin solder.

An integrated light source shown in FIG. 4B is formed on a semi-insulating InP substrate 650. The semiconductor laser portion 651 is a multi-quantum well distributed feedback laser portion made from an InGaAsP material; this multi-quantum well distributed feedback laser portion has a built-in diffraction grating 653, and has an operation wavelength band of 1.55 µm. On the other hand, the waveguide optical modulator 652 is an electric field absorption optical modulator portion that has a multi-quantum well structure made from an InGaAsP material. The semiconductor laser portion described above comprises a p-type electrode 654 and n-type electrode 655. As regards the optical modulator portion shown in FIG. 4B, reference numeral 663 is a ground line on optical element side; and reference numeral 664 is an index marker for positioning. On the upper part of the waveguide of the optical modulator, separated electrodes for modulator 662 having a length of a=50 µm are formed at intervals of Λ=100 µm cyclically. Corresponding to the mounting substrate, the number of electrode separation is 4.

FIG. 4C illustrates a structure in which an optical transmitter having a traveling-wave electrode is formed by performing junction down mounting of the optical integrated element on the high frequency substrate. Both of the high-frequency substrate and the optical integrated elements are disposed so that their surfaces having an electrode are jointed together. Then, using an image recognition technology that uses infrared transmission, both of them are mounted so that index markers of both are aligned with each other. Thus, the electrodes 662 of the optical modulation element are firmly fixed on the corresponding electrode and the corresponding high-frequency line on the high-frequency substrate through gold tin solder. As a result of it, an integrated structure of an electric field absorption optical modulator, which has the so-called capacitive loaded structure, has been formed automatically; more specifically, in the integrated structure of the electric field absorption optical modulator, modulator structures having a capacitive component are disposed at regular intervals on the distributed feedback semiconductor laser and the high-frequency line. By the way, in FIG. 4C, reference numeral 671 is an electric current source; and reference numeral 672 is a modulator driving signal source.

Because quantitative design relating to impedance matching of the capacitive loaded structure has already been described in the first embodiment, it will be omitted here. In this embodiment, in addition to the characteristics described in the first embodiment, the following advantages are added at the same time: an output level of a semiconductor laser is increased; and junction down mounting, which is advantageous to high reliability, can be realized.

As a result, an unmodulated output of 10 mW are measured at a wavelength of 1,552 µm by connecting the electric current source 671 to the completed optical transmitter to energize the optical transmitter with 100 mA in a forward direction. In this state, an excellent optical modulation waveform, which has rise and fall time of 12 ps or less and an extinction ratio of 12 dB or more, could be obtained by applying the modulator driving signal 672 having modulation speed of 40 gigabit per second and amplitude voltage of 2 Vpp to the high-frequency line 602.

Fourth Embodiment

Figure 5A:
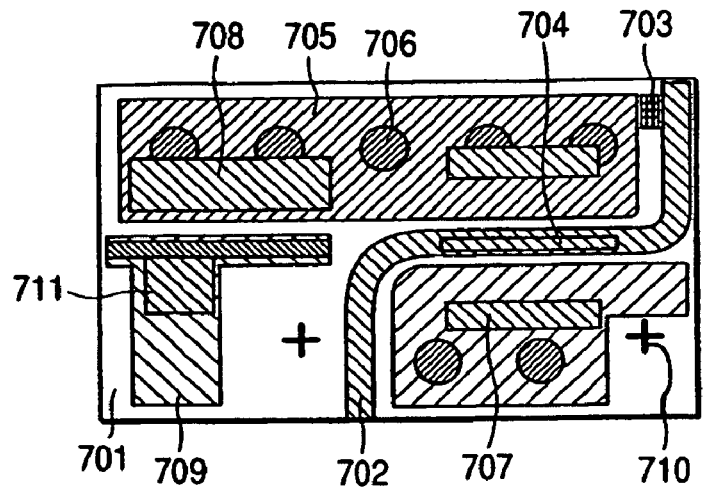
FIGS. 5A through 5C are top views illustrating a configuration of one embodiment of an optical transmitter according to the present invention.
Figure 5B:
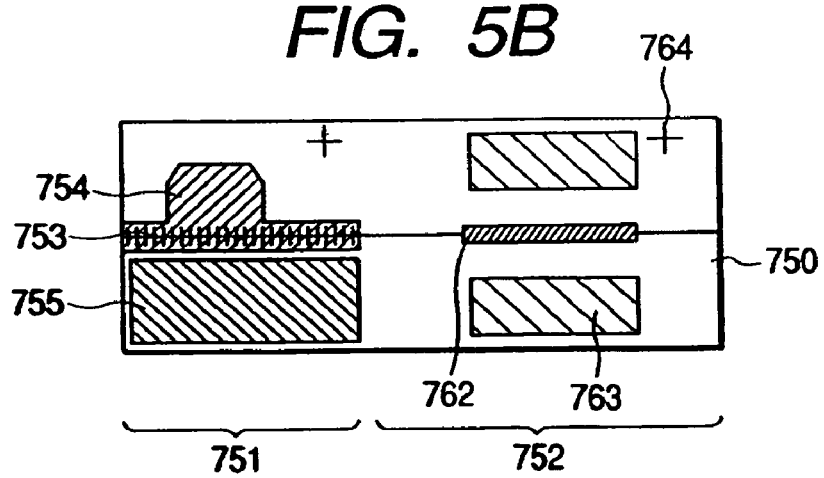
Figure 5C:
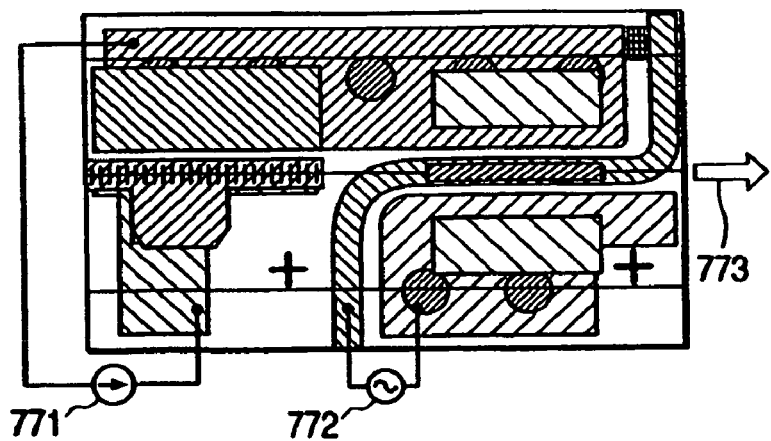

FIGS. 5A through 5C are top views illustrating a configuration of a new optical transmitter according to the present invention. More specifically, in the monolithically integrated light source made of the electric field absorption optical modulator and a semiconductor laser, which was described in the third embodiment, this embodiment has a configuration in which a structure of the traveling wave electrode has been improved. As is the case with the second embodiment, the optical transmitter is formed [FIG. 5C] by performing junction down mounting of an optical element [FIG. 5B] on a high-frequency substrate [FIG. 5A].

The structures of the high frequency substrate and the integrated light source, which were shown in FIGS. 5A, 5B respectively, are the same as those in the third embodiment except that the upper part electrode 762 of the optical modulator is not separated. In each figure, reference numeral 701 is a dielectric substrate; reference numeral 702 is a high-frequency line; reference numeral 703 is a terminal thin film resistance; reference numeral 704 is gold tin solder; reference numeral 705 is a ground line; reference numeral 706 is a ground via hole; reference numeral 707 is gold tin solder; reference numeral 708 is gold tin solder; reference numeral 709 is a laser driving electrode terminal; reference numeral 710 is an index marker for positioning; reference numeral 711 is gold tin solder; reference numeral 750 is a semi-insulating InP substrate; reference numeral 751 is a semiconductor laser portion, reference numeral 752 is a waveguide optical modulator portion; reference numeral 753 is a diffraction grating; reference numeral 754 is a p-type electrode; reference numeral 755 is a n-type electrode; reference numeral 762 is a modulator electrode; reference numeral 763 is a ground line on optical modulator side; and reference numeral 764 is an index marker for positioning. In FIG. 5C as a top view after mounting, an electric current source 771, a modulator driving signal 772, and a modulated light signal 773 are shown.

As described above, concerning the traveling-wave semiconductor waveguide, it is difficult to achieve complete impedance matching in the non-capacitive loaded structure, an electrode of which is not separated. Because of it, as traveling distances of a light signal and an electric signal, which are transmitted in parallel through an optical waveguide and a high-frequency line respectively, increase, difference in speed between the light signal and the electric signal causes signal traveling ranges of both to differ remarkably. Fortunately, the electric field absorption optical modulator has a short modulator length (about 200 µm), which is a traveling distance of each signal. Therefore, as compared with the optical interference modulator having a long modulator described in the first and the second embodiments, degradation in high-speed properties caused by mismatching of impedance can be reduced further.

As a result, an unmodulated output of 10 mW are measured at a wavelength of 1.31 µm by connecting the electric current source 771 to the completed optical transmitter to energize the optical transmitter with 80 mA in a forward direction. In this state, an excellent optical modulation waveform, which has rise and fall time of 12 ps or less and an extinction ratio of 12 dB or more, could be obtained by applying the modulator driving signal 772 having modulation speed of 40 gigabit per second and amplitude voltage of 2 Vpp to the high-frequency line 702.

Fifth Embodiment

Figure 6A:
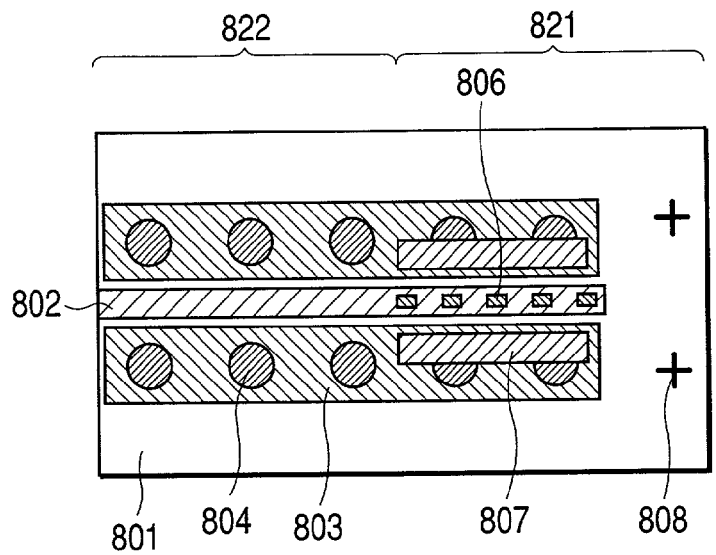
FIGS. 6A through 6C are top views illustrating a configuration of one embodiment of an optical receiver according to the present invention.
Figure 6B:
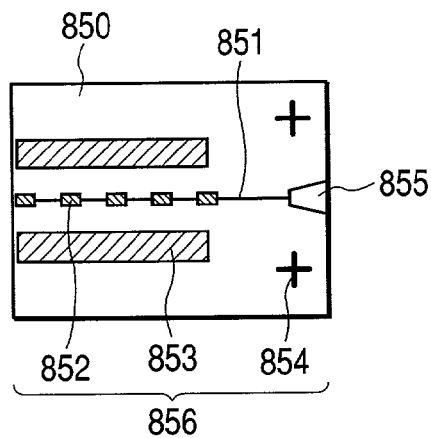
Figure 6C:
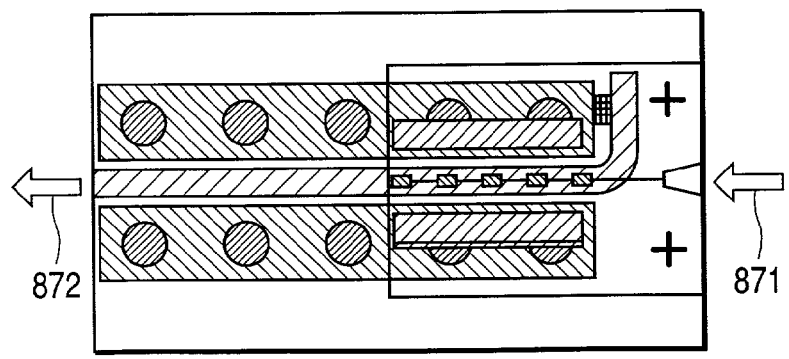

FIGS. 6A through 6C are top views illustrating a configuration of an optical receiver according to the present invention. More specifically, the figures illustrate a structure of a waveguide photodetector, which operates in a wavelength band of 1.3 µm or 1.55 µm, and its manufacturing technique. As shown in the figures, the optical transmitter is formed [FIG. 6C] by performing junction down mounting of a semiconductor optical element [FIG. 6B] on a high-frequency element mounting substrate [FIG. 6A].

The high-frequency element mounting substrate shown in FIG. 6A has a structure in which a high-frequency line 802, a pair of ground lines 803, and a ground via hole 804 are formed on a dielectric substrate 801 made from an aluminum nitride material. The high-frequency line 802 is formed by a multilayer thin film of Ti, Mo, Ni, Au. Its total thickness is 5 µm. Gold tin solder 807, which is used when mounting and firmly fixing optical elements in FIG. 6B later, is formed on the ground line 803. In addition, gold tin solder 806, which supplies power to separated electrodes of an optical element described later, is formed in an optical element mounted portion of the high-frequency line 802 at intervals of Λ=50 µm cyclically. The number of electrode separation is five on one side. By the way, reference numeral 808 is an index marker for positioning that is used at the time of mounting of the optical element. The high-frequency line 802 comprises an optical element mounted portion 821, and an electric output portion 822, if they are roughly classified.

As is the case with the first embodiment, characteristic impedance of the portions is set at 76Ω, 50Ω respectively beforehand.

An optical element shown in FIG. 6B is a waveguide photodetector 856 that is formed on a semi-insulating InP substrate 805. In this embodiment, a structure of the optical waveguide is the so-called rib loading type that is similar to the structure described in the first embodiment. On the upper part of a predetermined substrate, a semiconductor optical light receiving element, which forms an active layer area (for example, has a pin junction), is formed. For example, it is a III–V group compound semiconductor light receiving element. Concerning a structure of such a waveguide photodetector itself, a general structure suffices. Therefore, its detailed description will be omitted. A similar result can also be obtained from an example described below.

In FIG. 6B, reference numeral 851 is an optical waveguide; reference numeral 852 is separated electrodes of a photodetector; reference numeral 853 is a pair of ground lines on optical element side; and reference numeral 854 is an index marker for positioning. In addition, for the purpose of increasing input efficiency of a light signal incident from outside, a beam-expanded optical waveguide 855 is provided at an incident edge of the optical waveguide 851. As regards the beam-expanded optical waveguide itself, a conventional beam-expansion optical waveguide suffices. The optical waveguide 851 is constituted of a semiconductor that is transparent to signal light in a wavelength band of 1.3 μm or 1.55 μm. On the other hand, the lower part of the photodetector separated electrode 852 is constituted of a semiconductor that absorbs signal light. On the upper part of the optical waveguide, separated electrodes for modulator 852 having a length of a=30 μm are formed at intervals of Λ=50 μm cyclically. Corresponding to the mounting substrate, the number of electrode separation is 5.

FIG. 6C illustrates a structure in which a main part of an optical transmitter having a traveling-wave electrode is formed by performing junction down mounting of the optical modulation element on the high-frequency element mounting substrate. Both of the high-frequency element mounting substrate and the optical element are disposed so that their surfaces having an electrode are jointed together. Then, using an image recognition technology that uses infrared transmission, both of them are mounted so that index markers of both are aligned with each other. Thus, the separated electrodes 852 of the optical detection element are firmly fixed on the high-frequency line 802 on the high-frequency element mounting substrate through the gold tin solder 806. In this case, for the purpose of increasing bond strength of the optical modulation element and strengthening its ground, the gold tin solder 807 on the ground line 803 is used at the same time. As a result, it is possible to form the so-called capacitive load structure in which modulator structures having a capacitive component are disposed at regular intervals on the high-frequency line 802.

Because quantitative design relating to impedance matching of the capacitive loaded structure substantially has the same design values as those in the first embodiment, it will be omitted here.

While applying direct current bias of −5 V to the complete photodetector having a traveling-wave electrode, the incident light 871 having a wavelength of 1.55 μm, which has been modulated at high speed (at a speed of 40 gigabit per second), is provided. As a result, the electric signal 872 having the same speed is obtained. In this manner, the present invention can be applied not only to the optical modulator but also to the optical detection element. Moreover, the point that high-speed operation of other optical active and passive elements can be improved using a similar concept will be obvious to persons skilled in the art.

Sixth Embodiment

In the present invention, a high-frequency electric line on a mounting substrate becomes a traveling-wave electrode of a semiconductor optical element equivalently by the following steps: separately manufacturing the mounting substrate having the high-frequency electric line, and the semiconductor optical element for which high-frequency design has been applied beforehand; and then performing junction down mounting of drive electrodes of the mounting substrate and the semiconductor optical element through a soldering material. Using this junction down mounting enables hybrid integration of electronic elements that are used for driving and controlling a light source and a high-frequency semiconductor optical element electrically; hybrid integration using conventional monolithic integrated elements was difficult in the past. FIGS. 7, 8, 9 are top views illustrating a configuration of an optical transmitter-receiver using hybrid integration according to the present invention.

Figure 7A:
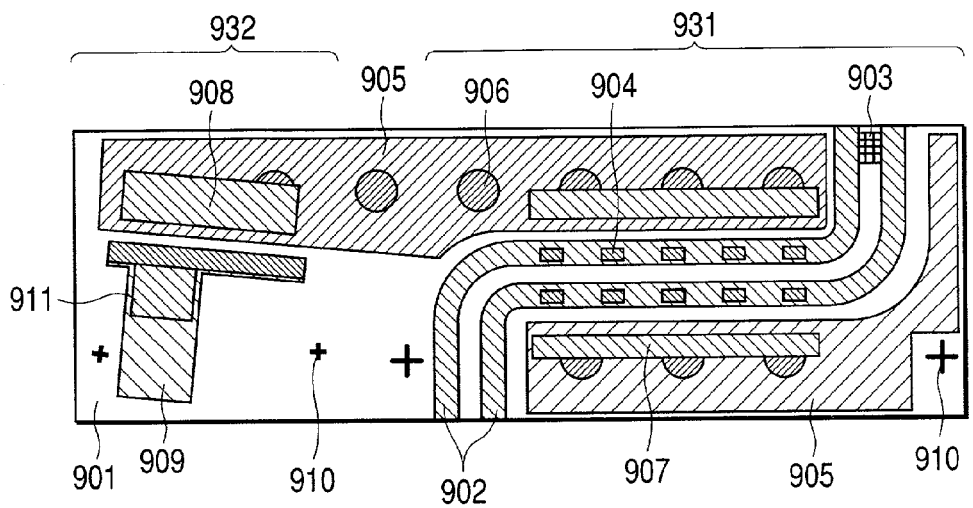
FIGS. 7A through 7C are top views illustrating a configuration of one embodiment of an optical transmitter according to the present invention.
Figure 7B:
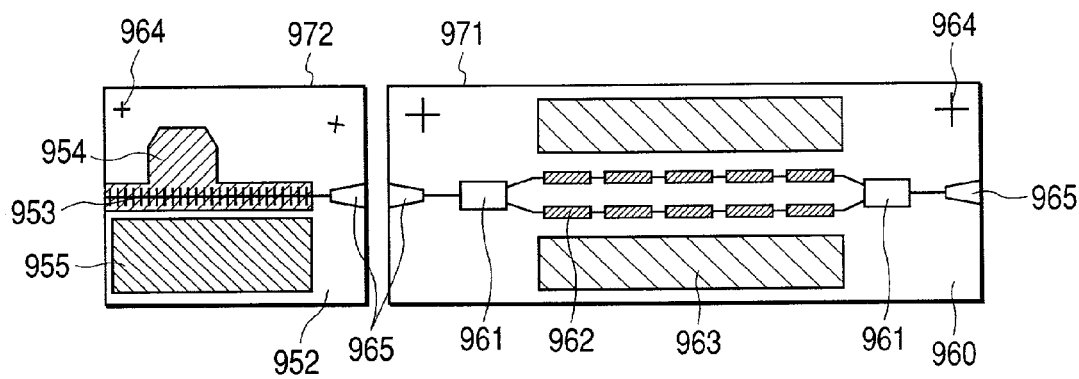
Figure 7C:
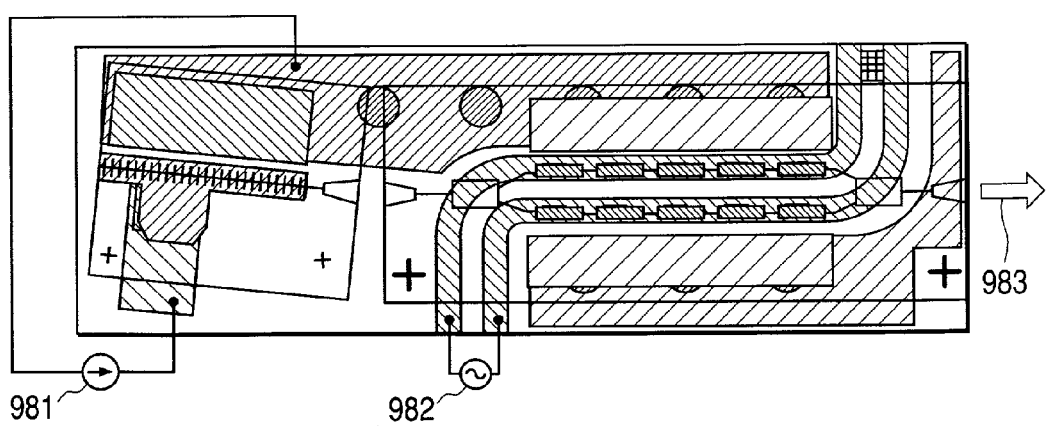

FIGS. 7A through 7C are top views illustrating a configuration in which the monolithically integrated element, described in the second embodiment, made of the waveguide optical modulator capable of operating in a wavelength band of 1.55 μm, and of the semiconductor laser as a laser light source, is realized using hybrid integration according to the present invention.

A high-frequency element mounting substrate shown in FIG. 7A is manufactured using a dielectric substrate 901 made from an aluminum nitride material. A mounted portion 931 of the optical modulator is configured in the same manner as that described in the first embodiment. A point of difference between this configuration and the first embodiment is that a semiconductor laser mounted portion 932 is formed on the same dielectric substrate 901. As is the case with the optical modulator mounted portion 931, it has an index marker for positioning 910. In addition, a laser mounting electrode portion 908 and a laser driving electrode portion 909 are formed. For the purpose of reducing light reflection between end faces of optical elements described below, a portion on which an optical modulator and a semiconductor laser are mounted has a slanting mount structure of 7 degrees. In this connection, in FIG. 7A, reference numeral 902 is a high-frequency line; reference numeral 903 is a terminal thin film resistance; reference numeral 904 is gold tin solder; reference numeral 905 is a ground line; reference numeral 906 is a ground via hole; reference numeral 907 is gold tin solder; reference numeral 908 is gold tin solder; reference numeral 909 is a laser driving electrode terminal; reference numeral 910 is an index marker for positioning; reference numeral 911 is gold tin solder; reference numeral 931 is an optical modulator mounted portion; and reference numeral 932 is a semiconductor laser mounted portion.

An optical modulator 971 shown in FIG. 7B has a configuration similar to the optical modulator in the first embodiment, and is formed on a semi-insulating GaAs substrate 960. A semiconductor laser 972 shown in the figure is formed on a n-type InP substrate. The semiconductor laser 972 is a multi-quantum well distributed feedback laser made from an InGaAsP material, which has an operation wavelength band of 1.55 μm, and which has a built-in diffraction grating 953. For the purpose of improving efficiency in optical coupling between the optical modulator 971 and the semiconductor laser 972, input and output edges of both are provided with a beam-expanded optical waveguide 965. In FIG. 7B, reference numeral 952 is a n-type InP substrate; reference numeral 953 is a diffraction grating; reference numeral 954 is a p-type electrode; reference numeral 955 is a n-type electrode; a reference numeral 960 is a semi-insulating GaAs substrate; reference numeral 961 is a multiplexer or a branching filter; reference numeral 962 is separated electrodes for modulator; reference numeral 963 is a ground line on optical modulator side; and reference numeral 964 is an index marker for positioning.

FIG. 7C illustrates a structure in which main parts of an optical transmitter comprising a semiconductor laser as a light source and an optical modulator having a traveling-wave electrode is formed by performing junction down mounting of the optical modulator 971 and the semiconductor laser 972 on the high-frequency element mounting substrate. Both of the high-frequency element mounting substrate and the optical element are disposed so that their surfaces having an electrode are jointed together. Then, using an image recognition technology that uses infrared transmission, both of them are mounted so that index markers of both are aligned with each other. Thus, the separated electrodes 962 of the optical modulation element are firmly fixed on the high-frequency line 902 on the high-frequency element mounting substrate through the gold tin solder 904. In this case, for the purpose of increasing bond strength of the optical modulation element and strengthening its ground, the gold tin solder 907 on the ground line 905 is used at the same time. In a similar manner, it is also possible to perform junction down mounting of the semiconductor laser. In the case of this configuration, ultrahigh-speed optical element parts, each of which is made from a different substrate material, can be integrated by means of a simple technique. In the figure, reference numeral 981 is an electric current source; reference numeral 982 is a modulator driving signal; and reference numeral 983 is a modulated light signal.

An unmodulated output of 10 mW are measured at a wavelength of 1.55 μm by connecting the electric current source 981 to the completed optical transmitter to energize the optical transmitter with 120 mA in a forward direction. In this state, an excellent optical modulation waveform, which has rise and fall time of 12 ps or less and an extinction ratio of 12 dB or more, could be obtained by applying the modulator driving signal 972 having modulation speed of 40 gigabit per second and amplitude voltage of 2 Vpp to the high-frequency line 902.

Seventh Embodiment

Figure 8A:
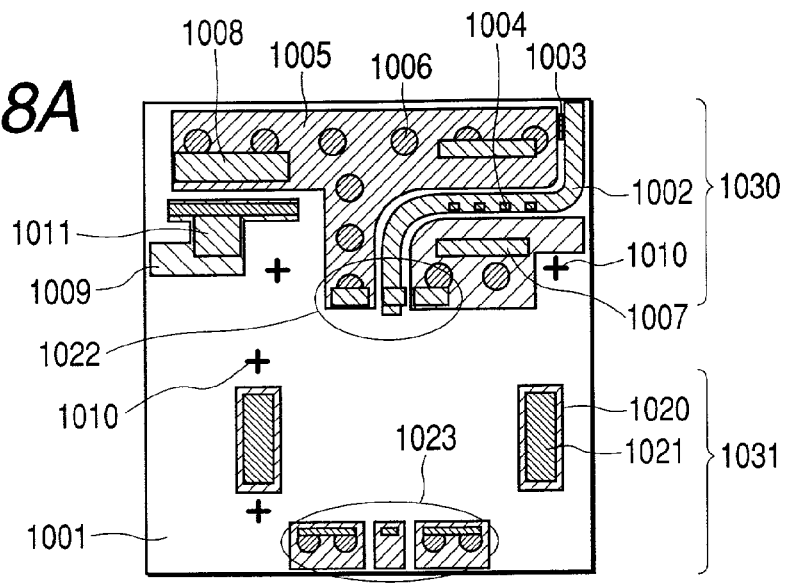
FIGS. 8A through 8C are top views illustrating a configuration of one embodiment of an optical transmitter according to the present invention.
Figure 8B:
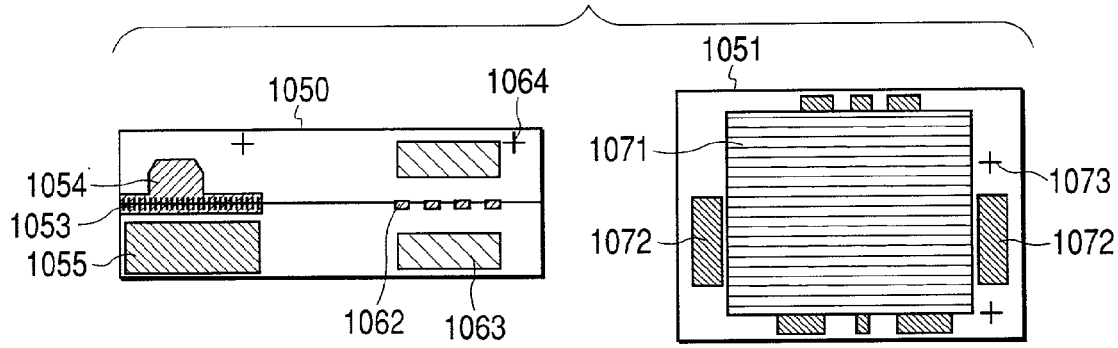
Figure 8C:
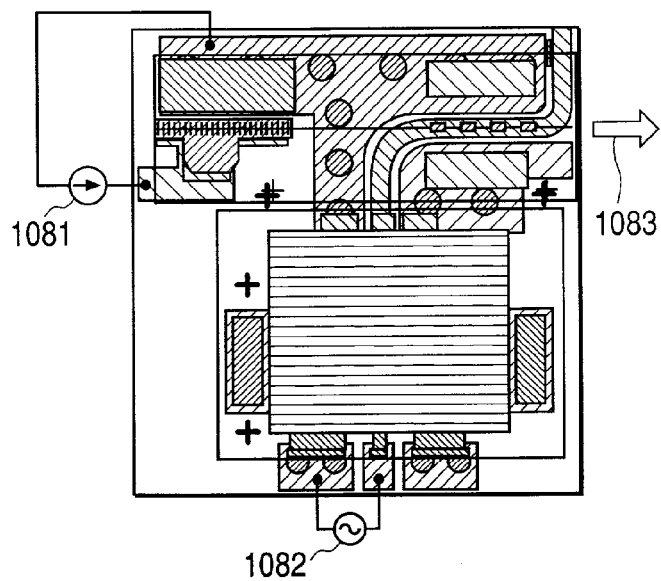

FIGS. 8A through 8C are top views illustrating configurations of main parts of a transmitter, in which the monolithically integrated element, described in the second embodiment, made of the waveguide optical modulator capable of operating in a wavelength band of 1.55 μm, and of the semiconductor laser as a laser light source, is integrated with a driver circuit of the waveguide optical modulator using hybrid integration according to the present invention. FIG. 8A is a top view of a mounting substrate; FIG. 8B illustrates a top view of an optical integrated element portion (left side), and a top view of a driver portion of the optical modulator (right side); and FIG. 8C is a top view of the mounted optical transmitter.

A high-frequency element mounting substrate shown in FIG. 8A is manufactured using a dielectric substrate 1001 made from an aluminum nitride material. A configuration of a mounted portion 1030 shown in the upper part of the figure, which is used for a monolithic optical integrated element 1050 made of a waveguide optical modulator and of a semiconductor laser light source, is the same as the configuration described in the second embodiment. A point of difference between this configuration and the second embodiment is that a pattern on which a driver circuit 1051 of the optical modulator is mounted is formed on the same dielectric substrate 1001. As is the case with the optical modulator mounted portion 1030, it has an index marker for positioning 1010. In addition, a terminal portion for securing driver 1020 and an electric input portion 1023 are formed.

The monolithically integrated element 1050 shown in FIG. 8B, which is made of the waveguide optical modulator and of the semiconductor laser light source, has a configuration similar to that in the second embodiment. This monolithically integrated element 1050 is formed on a semi-insulating InP substrate. In a similar manner, the driver circuit 1051 of the optical modulator, which is shown in the figure, comprises a hetero bipolar transistor formed on a semi-insulating InP. In the figure, reference numeral 1050 is a semi-insulating InP substrate; reference numeral 1051 is a semi-insulating InP substrate; reference numeral 1053 is a diffraction grating; reference numeral 1054 is a p-type electrode; reference numeral 1055 is a n-type electrode; reference number 1062 is separated electrodes for modulator; reference numeral 1063 is a ground line on optical modulator side; reference numeral 1064 is an index marker for positioning; reference numeral 1071 is a hetero bipolar transistor; reference number 1072 is a bonded portion; and reference numeral 1073 is an index marker for positioning.

FIG. 8C illustrates a structure in which a main part of the optical transmitter is formed by performing junction down mounting of the monolithic optical integrated element 1050 and the driver circuit 1051 on the high-frequency element mounting substrate; the main part of the optical transmitter comprises a semiconductor laser as a light source, an optical modulator having a traveling-wave electrode, and its drive circuit. Both of the high-frequency element mounting substrate and the element to be mounted are disposed so that their surfaces having an electrode are jointed together. Then, using an image recognition technology that uses infrared transmission, both of them are mounted so that index markers of both are aligned with each other. Thus, the electrodes of the optical and electronic elements are firmly fixed on the corresponding high-frequency line on the high-frequency element mounting substrate through gold tin solder. In the case of this configuration, the monolithic optical integrated element 1050 and the driver circuit 1051 are formed on the same semi-insulating InP substrate. Therefore, it is basically possible to integrate them monolithically. However, the following major problems can be expected: a size mismatch resulting from difference in chip sizes, that is to say, a chip size of an electronic device is several times as large as a general optical device; and decrease in a production yield particularly caused by integration of optical and electronic elements. For example, under the existing circumstances, if an ultrahigh-speed optical element having a yield of about 50% and an electronic element having a yield of about 50% are integrated monolithically, a total yield is decreased to around 25%, which is equivalent to the product of both yields. Concerning the hybrid integration according to the present invention, it is possible to select non-defective optical elements and non-defective electronic elements beforehand before mounting. Therefore, naturally, decrease in a production yield caused by integration can be avoided. In this connection, in the figure, reference numeral 1081 is an electric current source; reference numeral 1082 is a modulator driver input signal; and reference numeral 1083 is a modulated light signal that is emitted.

An unmodulated output of 10 mW are measured at a wavelength of 1.55 µm by connecting the electric current source 1081 to the completed optical transmitter to energize the optical transmitter with 80 mA in a forward direction. In this state, an excellent optical modulation waveform, which has rise and fall time of 10 ps or less and an extinction ratio of 12 dB or more, can be obtained by applying the modulator driver input signal 1082 having modulation speed of 40 gigabit per second and amplitude voltage of 400 mVpp to the driver input line 1023.

Eighth Embodiment

Figure 9A:
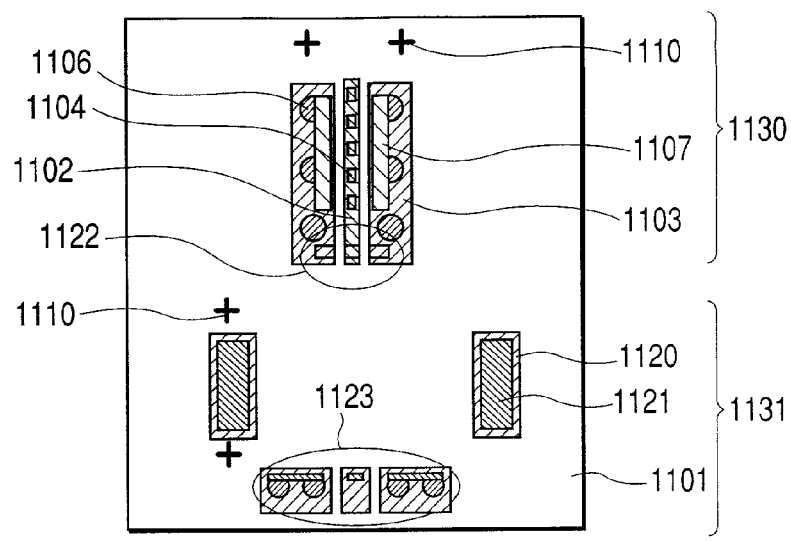
FIGS. 9A through 9C are top views illustrating a configuration of one embodiment of an optical receiver according to the present invention.
Figure 9B:
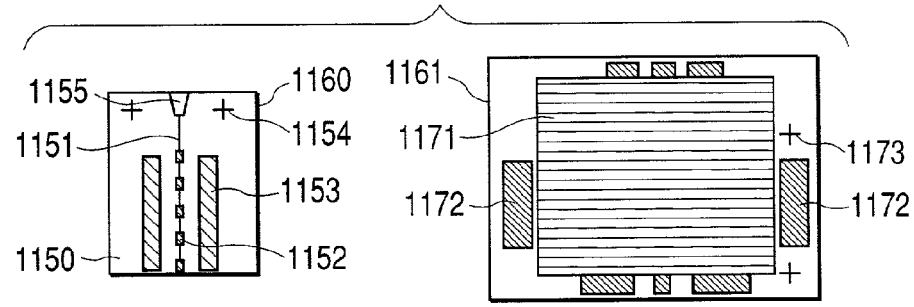
Figure 9C:
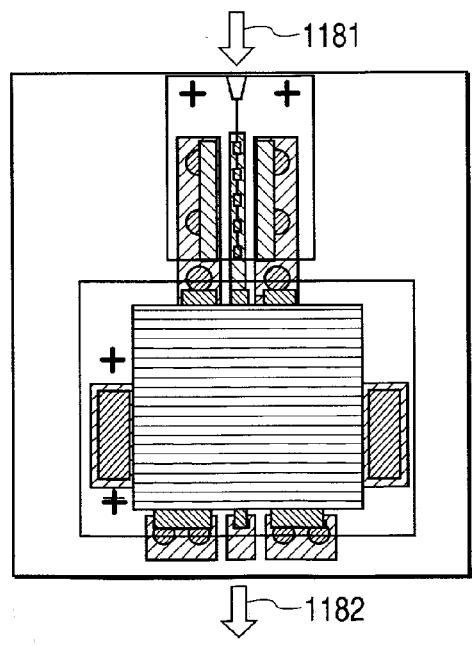

FIGS. 9A through 9C are top views illustrating a configuration of an optical receiver according to the present invention. More specifically, the figures illustrate a configuration in which a traveling-wave photodetector and a preamplifier are integrated using the hybrid integration method according to the present invention. FIG. 9A is a top view of a mounting substrate; FIG. 9B illustrates a top view of a photodetector portion (left side), and a top view of a preamplifier circuit portion (right side); and FIG. 9C is a top view of the mounted optical receiver.

A high-frequency implementation substrate shown in FIG. 9A is manufactured using a dielectric substrate 1101 made from an aluminum nitride material. A mounted portion 1130 of a high-speed photodetector 1160 shown in the upper part of the figure is configured substantially in the same manner as the configuration described in the fifth embodiment. A point of difference between this configuration and the fifth embodiment is that a pattern for mounting the preamplifier circuit 1161 is formed on the same dielectric substrate 1101. As is the case with the high-speed photodetector mounted portion 1130, it has an index marker for positioning 1110. In addition, a terminal portion for securing preamplifier 1120 and a preamplifier input portion 1123 are formed. In this connection, in the figure, reference numeral 1102 is a high-frequency line; reference numeral 1103 is a ground line; reference numeral 1104 is gold tin solder; reference numeral 1106 a ground via hole; reference numeral 1107 is gold tin solder; reference numeral 1121 is gold tin solder; reference numeral 1122 is a photodetector output portion; reference numeral 1130 is a photodetector mounted portion; and reference numeral 1131 is a preamplifier mounted portion.

A high-speed photodetector 1160 shown in FIG. 9B has a configuration similar to that in the fifth embodiment, and is formed on a semi-insulating InP substrate. In a similar manner, a preamplifier circuit 1161, which is shown in the figure, comprises a hetero bipolar transistor made from a SiGe material, which is formed on semi-insulating Si. In this connection, in the figure, reference numeral 1150 is a semi-insulating InP substrate; reference numeral 1151 is an optical waveguide; reference numeral 1152 is a separated electrode for photodetector; reference numeral 1153 is a ground line on optical element side; reference numeral 1154 is an index marker for positioning; reference numeral 1155 is a beam-expanded optical waveguide; a reference numeral 1160 is a waveguide photodetector; reference numeral 1161 is a preamplifier; reference numeral 1171 is a hetero bipolar transistor; reference numeral 1172 is a bonded portion; and reference numeral 1173 is an index marker for positioning.

FIG. 9C illustrates a structure in which a main part of an optical receiver is formed by performing junction down mounting of the high-speed photodetector 1160 and the preamplifier circuit 1161 on the high-frequency element mounting substrate. Both of the high-frequency element mounting substrate and the element to be mounted are disposed so that their surfaces having an electrode are jointed together. Then, using an image recognition technology that uses infrared transmission, both of them are mounted so that index markers of both are aligned with each other. Thus, the electrodes of the optical and electronic elements are firmly fixed on the corresponding high-frequency line on the high-frequency element mounting substrate through gold tin solder. In the case of this configuration, because a substrate material for forming the optical element is different from that of the electronic element, monolithic integration is very difficult. Therefore, this is a configuration example in which realization is not possible without using this method. Using this embodiment, it is also possible to select non-defective optical elements and non-defective electronic elements beforehand before mounting. Therefore, naturally, decrease in a production yield caused by integration can be avoided. In this connection, in the figure, reference numeral 1181 is incident light; and reference numeral 1182 is an optical demodulated signal.

It is possible to obtain an excellent demodulated waveform having rise and fall time of 15 ps or less and amplitude voltage of 100 mV or more by connecting power supply to the completed optical receiver, and by entering an optical modulated signal 1181, which has modulation speed of 40 gigabit per second and amplitude voltage of 0.1 mWpp, into a photodetector input waveguide 1155 at a wavelength of 1.55 µm.

Ninth Embodiment

As regards manufacturing of the optical transmitter in the first embodiment, the optical transmitter is manufactured according to steps described below. A part of a manufacturing process flow for this optical transmitter is schematically illustrated in FIG. 10. To be more specific, as a matter of course, to begin with, the optical transmitter is designed (1 in FIG. 10). On the basis of this design, a wafer of an external semiconductor modulator is manufactured (2 in FIG. 10). After this wafer manufacturing process is finished, additive capacity value Cad is measured (3 in FIG. 10), and then a desired external semiconductor modulator chip is selected (4 in FIG. 10). On the other hand, a high-frequency element mounting substrate is manufactured (5 in FIG. 10). After that, while making reference to the measured additive capacity value Cad (9 in FIG. 10), a high-frequency element mounting substrate having most preferable characteristic impedance is selected according to this value (6 in FIG. 10). By the way, in the first embodiment, the characteristic impedance was 76Ω. Thus, the external semiconductor modulator chip has been assembled on the high-frequency element mounting substrate by junction down mounting (7 in FIG. 10). In this way, the optical transmitter is completed (8 in FIG. 10).

Those steps require the following conditions. The characteristic impedance of the high-frequency line in the high-frequency element mounting substrate can be set at a desired value in the process of manufacturing by selecting a mask pattern of a photolithography process that forms a metal pattern of a high-frequency line. However, as opposed to this, concerning the additive capacity value of the external semiconductor modulator, there are several error factors including a thickness of a semiconductor layer, and density of impurities. Therefore, measurement after the wafer process is finished, and selection of the most preferable high-frequency line, are required. In a method for manufacturing an optical transmitter, which includes the process described above, even an external semiconductor modulator, which has been manufactured so as to have properties different from designed values, does not become a defective item. This produces an advantage that a production yield increases.

Figure 11:
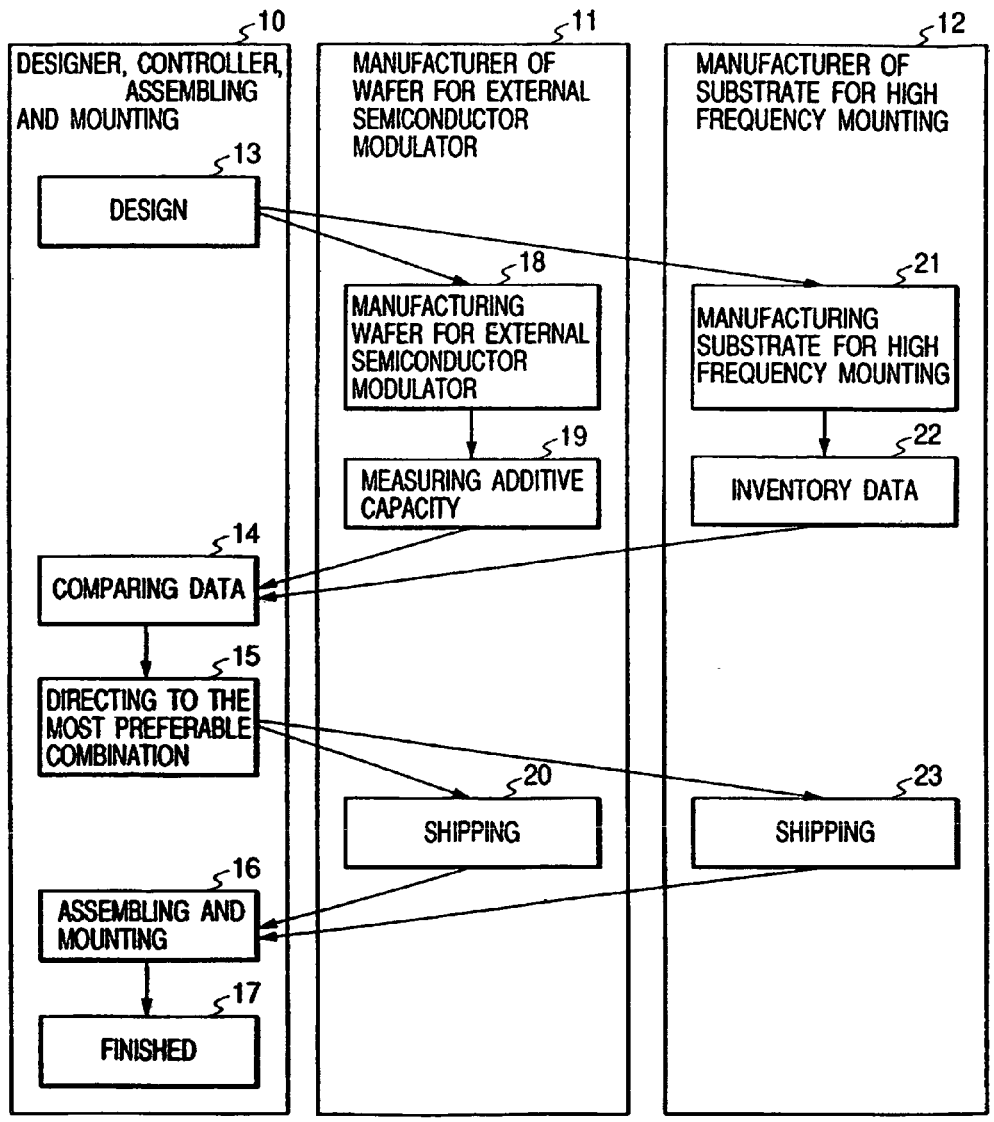
FIG. 11 is a flowchart schematically illustrating a manufacturing flow in which designing and management are performed by an assembling and mounting company that manufactures a final product.

In addition, as regards manufacturing of this optical transmitter, specialized companies may take charge of the following separately: manufacturing of an external semiconductor modulator; manufacturing of a high-frequency element mounting substrate; assembling and mounting of them; total management and design; and the like. FIG. 11 schematically illustrates a manufacturing flowchart in which designing and management are performed by an assembling and mounting company that manufactures a final product. In a block 10, a role of the company for designing, management, and assembling and mounting is shown; in a block 11, a role of a manufacturer of wafer for external semiconductor modulator is shown; and in a block 12, a role of a manufacturer of high-frequency element mounting substrate is shown.

The first company 10 designs the optical transmitter (13 in FIG. 11). Information on the design is sent to the company 11 and the company 12 as shown by arrows. The second company 11 manufactures a wafer for external semiconductor modulator (18 in FIG. 11). The additive capacity is measured for this wafer (19 of FIG. 11). On the other hand, the third company 12 manufactures a high-frequency element mounting substrate (21 in FIG. 11). Then, properties such as characteristic impedance of a high-frequency line are stored. The second company and the third company send data of the additive capacity, or characteristic information on the high-frequency line, to the first company as shown by arrows. The first company compares the data (14 in FIG. 11), and then selects a most preferable combination of both (15 in FIG. 11). After that, the first company instructs the second company and the third company of the most preferable combination as shown by arrows. On the basis of the instruction, the second company and the third company ship required items to the first company (20, 23 in FIG. 11). The first company, which has received the items, assembles the mounting substrate and the optical element (16 in FIG. 11). In this way, the optical transmitter, etc. is completed (17 in FIG. 11).

In this case, production yield is similarly improved by using the following processes: a process of measuring additive capacity after the wafer process for the external semiconductor modulator is finished; a process of selecting a high-frequency element mounting substrate having the most preferable characteristic impedance according to its result; and a process of assembling the external semiconductor modulator and the high-frequency element mounting substrate that have been selected as the most preferable combination. Moreover, in this case, by exchanging and making reference to the measured data of properties, it is possible to entrust the manufacturing process of semiconductor, the manufacturing process of high-frequency element mounting substrate, and the assembling and mounting, technological fields of which are different, to specialized companies as the need arises. This produces an advantage that job efficiency increases. Each of the following may be performed by a different company separately, or as a matter of course some of them may be performed by the same company: management, designing, manufacturing of external semiconductor modulator, manufacturing of high-frequency element mounting substrate, and assembling and mounting.

As described above, the embodiments of the present invention were described. Main modes of the present invention will be listed collectively as below.

(1) An optical transmitter comprises a laser light source; and an external semiconductor modulator for modulating output light of the laser light source; wherein the optical transmitter has a configuration of a traveling-wave optical modulator in which a high-frequency line formed on a substrate separated from a main substrate of the external semiconductor modulator is electrically connected to a control electrode for electrically driving the optical modulator.

(2) An optical transmitter comprises a laser light source; and an external semiconductor modulator for modulating output light of the laser light source; wherein a plurality of active components of the external modulator are disposed at predetermined intervals cyclically; and the optical transmitter has a configuration of a traveling-wave optical modulator in which a high-frequency line formed on a substrate separated from a main substrate of the external semiconductor modulator is electrically connected to a control electrode for electrically driving the plurality of active components.

(3) There is provided an optical transmitter according to the items (1) and (2), wherein light intensity is modulated using change in absorption of light, the change being caused by applying of an electric field to an optical control layer.

(4) There is provided an optical transmitter according to the items (1) and (2), wherein at least one of intensity, a frequency, and a phase, relating to a light wave, are modulated using change in a refractive index, the change being caused by applying of an electric field to an optical control layer.

(5) There is provided an optical transmitter according to the items (1) through (4), wherein the semiconductor substrate, on which the optical modulator is formed, is made from indium phosphide or gallium arsenide; and the substrate, on which the high-frequency line is formed, is made from at least one of silicon, aluminum nitride, boron nitride, silicon oxide, aluminum oxide, beryllium oxide, silicon carbide, and diamond.

(6) There is provided an optical transmitter according to the items (1) through (5), wherein a semiconductor laser light source and an optical modulator are monolithically integrated.

(7) There is provided an optical transmitter according to the items (1) through (5), wherein a semiconductor laser light source and an external optical modulator are hybrid integrated.

(8) There is provided an optical transmitter according to the items (1) through (7), wherein a drive circuit of the external modulator has a traveling-wave type output mode; and an output of the drive circuit is electrically connected to the high-frequency line.

(9) There is provided an optical transmitter according to the item (8), wherein the drive circuit is mounted on the substrate on which the high-frequency line is formed.

(10) There is provided an optical receiver, wherein, in the optical receiver, a pin type light receiving element, which has a configuration in which a light absorption layer is sandwiched by a p-type layer and a n-type layer, is disposed on a semiconductor substrate; and the optical receiver has a configuration of a traveling-wave optical modulator in which a high-frequency line formed on a substrate separated from the semiconductor substrate is electrically connected to a control electrode for detecting an electric output of the pin type light receiving element.

(11) There is provided an optical receiver, wherein, in the optical receiver, a plurality of pin type light receiving elements, each of which has a configuration in which a light absorption layer is sandwiched by a p-type layer and a n-type layer, are disposed on a semiconductor substrate at predetermined intervals cyclically; and the optical receiver has a configuration of a traveling-wave optical modulator in which a high-frequency line formed on a substrate separated from the semiconductor substrate is electrically connected to a control electrode for detecting electric outputs of the plurality of pin type light receiving elements.

(12) There is provided an optical receiver according to the item (11), wherein a preamplifier circuit of the optical receiver has a traveling-wave type input mode; and an input portion of the preamplifier circuit is electrically connected to the high-frequency line.

(13) There is provided an optical receiver according to the item (12), wherein the preamplifier circuit is mounted on the substrate on which the high-frequency line is formed.

(14) There is provided a method for manufacturing any one of an optical transmitter, an optical receiver, and an optical transmitter-receiver according to the items (1) through (13), the method comprising the steps of a process of measuring an additive capacity value of a semiconductor optical element after a process of a wafer for the semiconductor optical element is completed; a process of selecting or manufacturing a high-frequency element mounting substrate, on which a high-frequency line having the most appropriate characteristic impedance value is formed, on the basis of the value; and a process of electrically connecting the semiconductor optical element to the high-frequency element mounting substrate after that.

(15) There is provided a method for manufacturing any one of an optical transmitter, an optical receiver, and an optical transmitter-receiver according to the items (1) through (13), the method comprising the steps of a process of measuring an additive capacity value by a semiconductor optical element manufacturer after a process of a wafer for a semiconductor optical element is finished; a process of comparing data of the additive capacity value of the semiconductor optical element with data of characteristic impedance of the high-frequency line, the characteristic impedance data being possessed by a high-frequency element mounting substrate manufacturer; and a process of shipping a high-frequency element mounting substrate, which has a characteristic impedance value that is most appropriate to the semiconductor optical element, to an assembling company of the optical transmitter or the optical receiver.

If the method for manufacturing an optical device in the item (15) is expressed in other words, it can be described as below. To be more specific, a method for manufacturing an optical device comprises the steps of a process of measuring an additive capacity value by a first company after a process of a wafer for a semiconductor optical element is finished; a process of comparing data of the additive capacity value of the semiconductor optical element with data of characteristic impedance of a high-frequency line, the characteristic impedance data being possessed by a second company; and a process of shipping a high-frequency element mounting substrate, which has a characteristic impedance value that is most appropriate to the semiconductor optical element, to a third company.

As described above, according to the present invention, a high-frequency element mounting substrate having a high-frequency electric line, and a semiconductor optical element for which high-frequency design has been applied beforehand, can be optimally designed and made individually. Moreover, it is possible to perform hybrid integration of an optical element and an electronic element, each of which is made from a different substrate material, without deteriorating their properties. The present invention provides a structure and a manufacturing technique that are particularly suitable for a high-speed external optical modulator, an optical transmitter using this, a high-speed light receiving element, and an optical receiver. If the present invention is used, not only remarkable improvement in element performance and a yield, but also a low-cost, large-capacity, and long-distance optical communication system to which this element is applied can be realized easily.

According to the present invention, an optical transmitter, an optical receiver, or an optical transmitter-receiver, each of which uses an optical element of a traveling wave type, can be provided while keeping high-speed operation. Moreover, according to another aspect of the present invention, it is possible to provide an optical transmitter, an optical receiver, or an optical transmitter-receiver, having the same properties, simply.

Reference Numbers in the Figures are as follows:

101: Dielectric substrate, 102: High-frequency line, 103: Terminal thin film resistance, 104: Ground via hole, 105: Gold tin solder, 106: Gold tin solder, 107: Ground line, 108: Index marker for positioning, 121: Terminal portion, 122: Electric input portion, 123: Optical element mounted portion, 201: Semi-insulating GaAs substrate, 202: Optical branching filter, 203: Separated electrode for modulator, 204: Ground line on optical element side, 205: Index marker for positioning, 301: Incident light, 302: Modulated light, 303: High-frequency signal, 401: Semi-insulating GaAs substrate, 402: Al 0.3 Ga 0.7 As clad layer, 403: GaAs core layer, 404: Al 0.3 Ga 0.7 As clad layer, 405: Rib waveguide portion, 501: Dielectric substrate, 502 High-frequency line, 503: Terminal thin film resistance, 504: Gold tin solder, 505: Ground line, 506: Ground via hole, 507: Gold tin solder, 509: Laser driving electrode terminal, 510: Index marker for positioning, 511: Gold tin solder, 550: Semi-insulating InP substrate, 551: Semiconductor laser, 552: Waveguide optical modulator, 553: Diffraction grating, 554: p-type electrode, 555: n-type electrode, 561: Optical branching filter, 562: Separate electrode for modulator, 563: Ground line on optical modulator side, 564: Index marker for positioning, 571: Electric current source, 572: Modulator driving signal, 573: Modulated light signal, 601: Dielectric substrate, 602: High-frequency line, 603: Terminal thin film resistance, 604: Gold tin solder, 605: Ground line, 606: Ground via hole, 607: Gold tin solder, 608: Gold tin solder, 609: Laser driving electrode terminal, 610: Index marker for positioning, 611: Gold tin solder, 650: Semi-insulating InP substrate, 651: Semiconductor laser, 652: Waveguide optical modulator, 653: Diffraction grating, 654: p-type electrode, 655: n-type electrode, 662: Separate electrode for modulator, 663: Ground line on optical modulator side, 664: Index marker for positioning, 671: Electric current source, 672: Modulator driving signal, 673: Modulated light signal, 701: Dielectric substrate, 702: High-frequency line, 703: Terminal thin film resistance, 704: Gold tin solder, 705: Ground line, 706: Ground via hole, 707: Gold tin solder, 708: Gold tin solder, 709: Laser driving electrode terminal, 710: Index marker for positioning, 711: Gold tin solder, 750: Semi-insulating InP substrate, 751: Semiconductor laser, 752: Waveguide optical modulator, 753: Diffraction grating, 754: p-type electrode, 755: n-type electrode, 762: Modulator electrode, 763: Ground line on optical modulator side, 764: Index marker for positioning, 771: Electric current source, 772: Modulator driving signal, 773: Modulated light signal, 801: Dielectric substrate, 802: High-frequency line, 803: Ground line, 804: Ground via hole, 806: Gold tin solder, 807: Gold tin solder, 808: Index marker for positioning, 821: Optical element mounted portion, 822: Electric output portion, 850: Semi-insulating InP substrate, 851: Optical waveguide, 852: Separated electrode for photodetector, 853: Ground line on optical element side, 854: Index marker for positioning, 855: Beam-expanded optical waveguide, 856: Waveguide photodetector, 871: Incident light, 872: Optical demodulated signal, 901: Dielectric substrate, 902: High-frequency line, 903: Terminal thin film resistance, 904: Gold tin solder, 905: Ground line, 906: Ground via hole, 907: Gold tin solder, 908: Gold tin solder, 909: Laser driving electrode terminal, 910: Index marker for positioning, 911: Gold tin solder, 931: Optical modulator mounted portion, 932: Semiconductor laser mounted portion, 952: n-type InP substrate, 953: Diffraction grating, 954: p-type electrode, 955: n-type electrode, 960: Semi-insulating GaAs substrate, 961: Multiplexer or branching filter, 962: Separated electrode for modulator, 963: Ground line on optical modulator side, 964: Index marker for positioning, 965: Beam-expanded optical waveguide, 971: Optical modulator, 972: Semiconductor laser, 981: Electric current source, 982: Modulator driving signal, 983: Modulated light signal, 1001: Dielectric substrate, 1002: High-frequency line, 1003: Terminal thin film resistance, 1004: Gold tin solder, 1005: Ground line, 1006: Ground via hole, 1007: Gold tin solder, 1008: Gold tin solder, 1009: Laser driving electrode terminal, 1010: Index marker for positioning, 1011: Gold tin solder, 1030: Optical modulator mounted portion, 1031: Semiconductor laser mounted portion, 1050: Semi-insulating InP substrate, 1051: Semi-insulating InP substrate, 1053: Diffraction grating, 1054: p-type electrode, 1055: n-type electrode, 1062: Separated electrode for modulator, 1063: Ground line on optical modulator side, 1064: Index marker for positioning, 1071 Hetero bipolar transistor, 1072: Bonded portion, 1073: Index marker for positioning, 1081: Electric current source, 1082: Modulator driver input signal, 1083: Modulated light signal, 1101: Dielectric substrate, 1102: High-frequency line, 1103: Ground line, 1104: Gold tin solder, 1106 Ground via hole, 1107: Gold tin solder, 1110: Index marker for positioning, 1120: Bonded portion, 1121: Gold tin solder, 1122: Photodetector output portion, 1123: Preamplifier output portion, 1130: Photodetector mounted portion, 1131: Preamplifier mounted portion, 1150: Semi-insulating InP substrate, 1151: Optical waveguide, 1152 Separated electrode for photodetector, 1153: Ground line on optical element side, 1154: Index marker for positioning, 1155: Beam-expanded optical waveguide, 1160: Waveguide photodetector, 1161: Preamplifier, 1171: Hetero bipolar transistor, 1172: Bonded portion, 1173: Index marker for positioning, 1181: Incident light, 1182: Light demodulated signal

What is claimed is:

1. An optical transmitter-receiver, comprising:
an optical transmitter, said optical transmitter comprising:
a semiconductor laser light source; and
a traveling-wave optical modulator for modulating output light of the semiconductor laser light source, wherein:
said traveling-wave optical modulator comprises
an external semiconductor modulator disposed on a first substrate, said external semiconductor modulator being capable of modulating output light of the semiconductor laser light source, the external semiconductor modulator comprising an optical interference waveguide and a plurality of separated electrodes being disposed on an optical interference waveguide cyclically,
a high-frequency line disposed on a second substrate separated from the first substrate,
a plurality of separated electrodes being disposed cyclically on a part of the high-frequency line corresponding to the external semiconductor modulator, the first substrate being fixedly secured to the second substrate with an active layer side of the external semiconductor modulator disposed on the first substrate and a high-frequency line side of the second substrate facing each other so that each separated electrode disposed on the optical interference waveguide is fixedly secured on the high-frequency line through the corresponding separated electrodes disposed on the high-frequency line each other, and
in said traveling-wave optical modulator, a control electrode for the external semiconductor modulator, which is included in the external semiconductor modulator, is electrically connected to the high-frequency line; and
an optical receiver, said optical receiver comprising:
a light receiving element disposed on a third substrate;
a high-frequency line disposed on a fourth substrate separated from the third substrate;
a traveling-wave optical modulator in which an electrode used for detecting an electric output of the light receiving element is electrically connected to the high-frequency line;
a plurality of separated electrodes being disposed cyclically on a part of the high-frequency line corresponding to the traveling-wave optical modulator, the traveling-wave optical modulator comprising an optical interference waveguide; and
a plurality of separated electrodes being disposed on the optical interference waveguide cyclically, said electrode being included in the light receiving element,
wherein the third substrate is fixedly secured to the fourth substrate with an active layer side of the light receiving element disposed on the third substrate and a high-frequency line side of the fourth substrate facing each other so that each of the separated electrode disposed on the optical interference waveguide is fixedly secured on the high-frequency line through the corresponding separated electrodes disposed on the high-frequency line each other.

2. An optical transmitter according to claim 1, wherein: the first substrate and the third substrate are common; and the second substrate and the fourth substrate are common.

3. An optical transmitter-receiver according to claim 1, wherein the second substrate and the fourth substrate are the same substrate.

4. An optical receiver, comprising:
a light receiving element disposed on a first substrate;
a high-frequency line disposed on a second substrate separated from the first substrate; and
a traveling-wave optical modulator in which an electrode used for detecting an electric output of the light receiving element is electrically connected to the high-frequency line, wherein said traveling-wave optical modulator comprises optical interference waveguides and a plurality of separated electrodes being disposed on the optical interference waveguides cyclically, said high-frequency line has a plurality of separated electrodes cyclically on a part of the high-frequency line corresponding to the traveling-wave optical modulator, and the first substrate is fixedly secured to the second substrate with an active layer side of the light receiving element disposed on the first substrate and a high-frequency line side of the second substrate facing each other so that each of the separated electrode disposed on the optical interference waveguide is fixedly secured on the high-frequency line through the corresponding separated electrode disposed on high-frequency line each other.

5. An optical receiver according to claim 4, wherein:
the first substrate is fixedly secured to the second substrate with an active layer side of the light receiving element disposed on the first substrate and a high-frequency line side of the second substrate facing each other.

6. An optical receiver according to claim 5, wherein:
the light receiving element has a plurality of light receiving areas that are disposed at predetermined intervals cyclically; and
said optical receiver comprises a traveling-wave optical modulator to which an electrode used for detecting each electric output of the light receiving element is electrically connected, said each electric output being produced in each of the plurality of light receiving areas.

7. An optical receiver according to claim 6, wherein:
a preamplifier circuit is disposed on the second substrate; and
the preamplifier circuit uses a traveling-wave type input mode, and an input portion of the preamplifier circuit is electrically connected to the high-frequency line.

8. An optical receiver according to claim 5, wherein:
a preamplifier circuit is disposed on the second substrate; and
an input portion of the preamplifier circuit is electrically connected to the high-frequency line.

9. An optical transmitter-receiver, comprising:
an electric input portion,
an optical mounted portion,
a terminal portion formed on a dielectric substrate, said terminal portion including a pair of high-frequency lines, said high-frequency lines having a plurality of separated electrodes cyclically on a part corresponding to said optical mounted portion, and
an optical modulation element formed on a semi-insulating substrate, said optical modulation element comprising a plurality of separated electrodes of said optical modulation element corresponding to a plurality of the separated electrodes formed on said high-frequency lines,
wherein the dielectric substrate is fixedly secured to the semi-insulating substrate so that the separated electrodes of said optical modulation element are fixedly secured to the corresponding separated electrodes formed on said high-frequency lines, and
each of characteristic impedances of said electric input portion, said optical mounted portion and said terminal portion is designated so that that $V_{opt}$ is almost equivalent to $V_{ele}$, wherein $V_{opt}$ is a value of Co (light velocity)/neff(effective refractive index of a semiconductor waveguide), and $V_{ele}$ is a value of high-frequency phase velocity.

10. An optical transmitter-receiver according to claim 9, wherein the pair of high-frequency lines has a terminal resistance value of approximately 50.0.

11. An optical transmitter-receiver according to claim 9, wherein the characteristic impedance for said electric input portion, said optical mounted portion and said terminal portion are 50Ω, 76Ω and 50Ω, respectively.

* * * * *